United States Patent
Theeg

(10) Patent No.: US 11,525,954 B2
(45) Date of Patent: Dec. 13, 2022

(54) GLASS FIBER

(71) Applicant: FIBERBRIDGE PHOTONICS GMBH, Hannover (DE)

(72) Inventor: Thomas Theeg, Seelze (DE)

(73) Assignee: FIBERBRIDGE PHOTONICS GMBH

( * ) Notice: Subject to any disclaimer, the term of this patent is extended or adjusted under 35 U.S.C. 154(b) by 0 days.

(21) Appl. No.: 17/324,517

(22) Filed: May 19, 2021

(65) Prior Publication Data

US 2021/0364691 A1 Nov. 25, 2021

(30) Foreign Application Priority Data

May 20, 2020 (DE) .............. 10 2020 113 731.1

(51) Int. Cl.
*G02B 6/02* (2006.01)
(52) U.S. Cl.
CPC ..... *G02B 6/02395* (2013.01); *G02B 6/02309* (2013.01); *G02B 6/02314* (2013.01)
(58) Field of Classification Search
CPC ............ G02B 6/02395; G02B 6/02309; G02B 6/02314
See application file for complete search history.

(56) References Cited

U.S. PATENT DOCUMENTS

| | | | |
|---|---|---|---|
| 5,248,311 A * | 9/1993 | Black ............ | G02B 6/02 606/7 |
| 5,432,876 A | 7/1995 | Appeldorn et al. | |
| 7,412,133 B2 * | 8/2008 | Yoon ............ | G02B 6/02066 385/39 |
| 8,306,597 B2 * | 11/2012 | Chang .......... | G01N 21/474 600/324 |
| 10,016,120 B2 * | 7/2018 | Fujita .......... | A61B 1/00 |

(Continued)

FOREIGN PATENT DOCUMENTS

| CN | 106405737 A | 2/2017 |
|---|---|---|
| JP | 2014010427 A | 1/2014 |
| WO | 2011067908 A1 | 6/2011 |

OTHER PUBLICATIONS

Machine Translation of WO2011067908 Optical fiber and method for working optical fiber, Nakamura et al, 2011.*

*Primary Examiner* — Ellen E Kim
(74) *Attorney, Agent, or Firm* — Gardner Groff & Greenwald, PC

(57) ABSTRACT

The present invention relates to a glass fiber (1) comprising at least one fiber core (10), at least one fiber cladding (11) which at least substantially encloses the fiber core (10) in the circumferential direction (U) and along the longitudinal axis (X), and at least one fiber coating (12) which substantially encloses the fiber cladding (11) in the circumferential direction (U) and along the longitudinal axis (X), wherein the glass fiber (1) has at least one first exposed portion (13*a*) where the fiber cladding (11) is exposed by the fiber coating (12), for removing light (B) at least from the fiber cladding (11), wherein at least the fiber cladding (11) has a plurality of recesses (14) at least substantially in the radial direction (R), which recesses are designed to at least partially discharge the light (B) at least from the fiber cladding (11). The glass fiber (1) is characterized in that the recesses (14), as longitudinal recesses (14), are each formed at least in portions precisely along the longitudinal axis (X).

21 Claims, 22 Drawing Sheets

(56) References Cited

U.S. PATENT DOCUMENTS

| | | | |
|---|---|---|---|
| 10,302,933 B2* | 5/2019 | Tojo | G01B 11/24 |
| 2010/0098722 A1 | 4/2010 | Mersch et al. | |
| 2015/0057648 A1* | 2/2015 | Swift | A61B 18/245 |
| | | | 606/15 |
| 2015/0362684 A1 | 12/2015 | Seo | |
| 2016/0081761 A1* | 3/2016 | Kuboi | A61B 1/005 |
| | | | 600/424 |
| 2016/0166130 A1 | 6/2016 | Fujita et al. | |
| 2020/0041719 A1 | 2/2020 | Zheng et al. | |

* cited by examiner

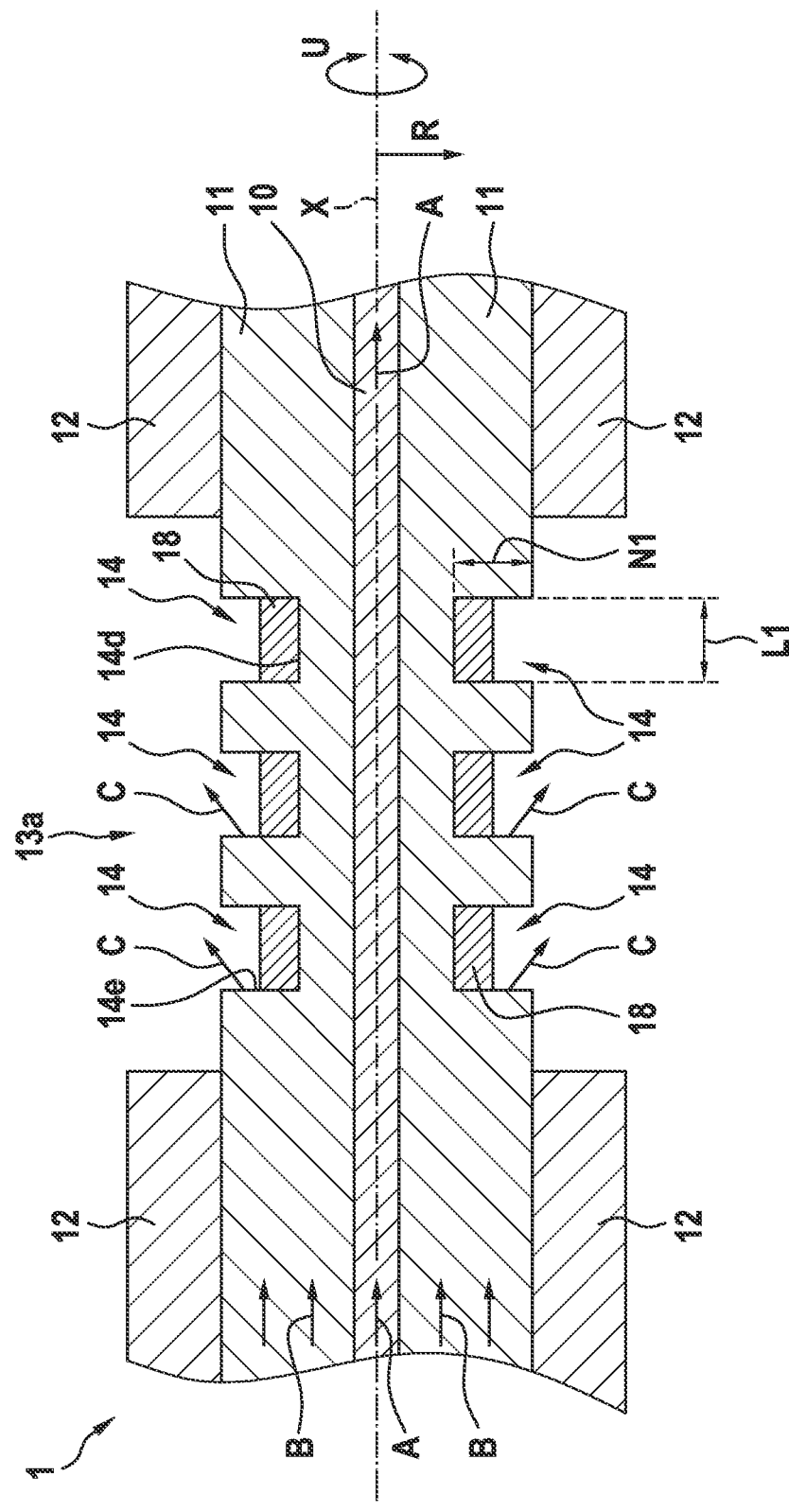

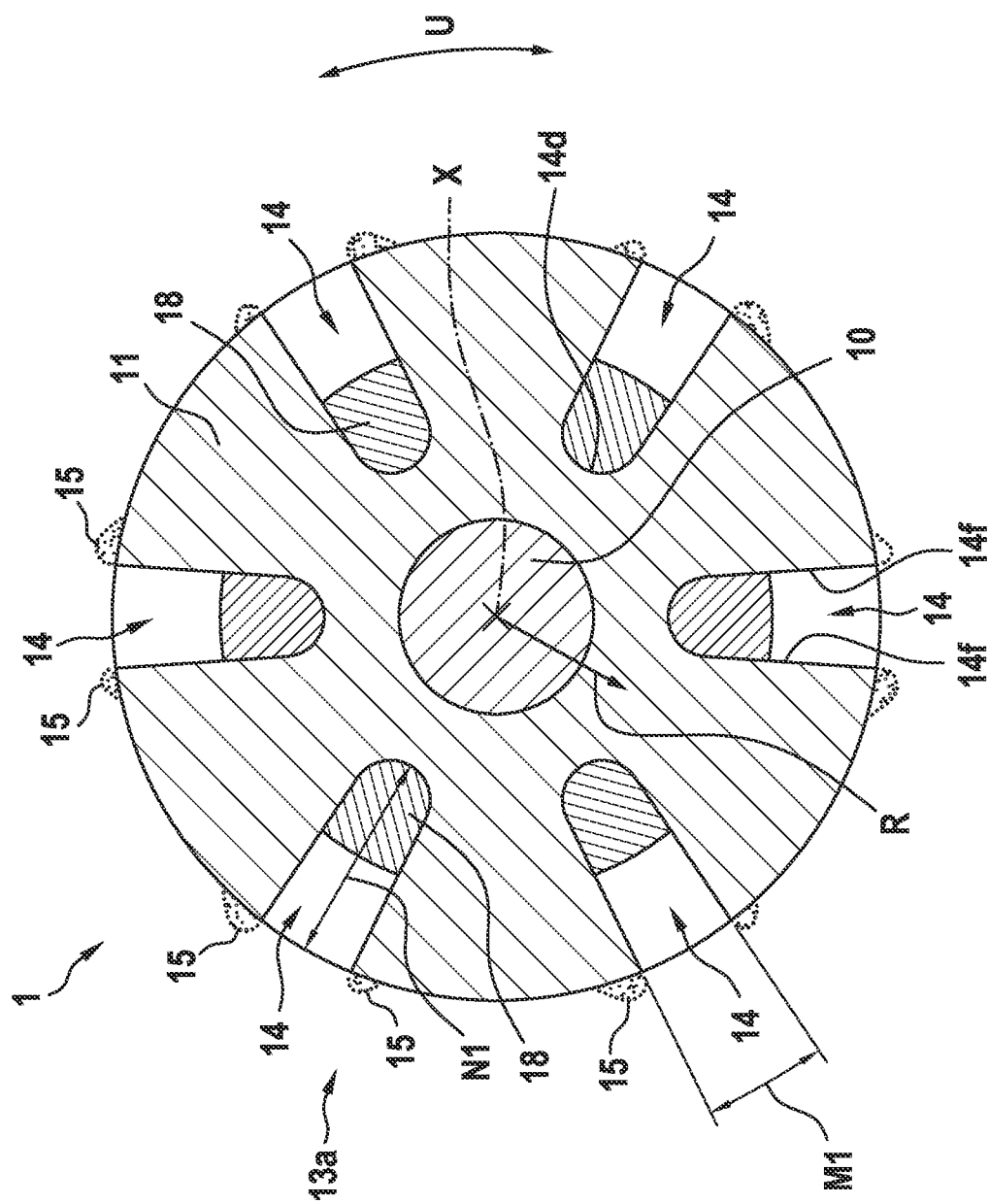

GLASS FIBER

The present invention relates to a glass fiber according to the preamble of claim 1 and a glass fiber product comprising such a glass fiber according to claim 22.

Nowadays, glass fibers are used in many different technical fields. Glass fibers are usually drawn as thin threads from a glass melt, such that a glass fiber is a long, thin fiber made of glass. Glass fibers can be used, for example, as a textile fabric for thermal insulation and/or for sound insulation. Short pieces of glass fiber are also usually admixed with plastics materials in order to improve their mechanical properties; such components can be referred to as glass fiber reinforced plastics materials.

However, there are also numerous technical and in particular highly technical applications in which glass fibers are used for light transmission. For example, glass fibers are used for data transmission by means of light; in this case, the glass fibers can also be referred to as optical waveguides or as passive glass fibers. Glass fibers are also used in medicine, for example for lighting and for generating images, for example in microscopes, in inspection cameras and in endoscopes. Furthermore, glass fibers are used in sensors, which can then be referred to as fiber optic sensors.

Another field of application for glass fibers is laser technology. In this case, the laser radiation can be conducted by means of a glass fiber from a laser radiation source to a machining point in order to carry out, for example, cutting or welding at said point in material machining or in medicine, for example. The laser beam can also be supplied to a sample in this way, for example in measurement technology, in microscopy or in spectroscopy. Glass fibers can be used to conduct a laser beam, for example, in applications in mechanical engineering, in telecommunications, in medical technology and in sensor technology.

Glass fibers can also be used to generate laser light and are referred to as active glass fibers. Fiber lasers or fiber amplifiers have a doped fiber core (see below), which forms the active medium of the laser. Usual doping elements of the laser-active fiber core are in particular neodymium, ytterbium, erbium, thulium and holmium. Fiber lasers of this kind are usually optically pumped by coupling the radiation, for example from diode lasers or other radiation sources, as pump light into the fiber cladding in parallel with the signal light in the fiber core, or directly into the fiber core. If the pump light is radiated in the glass fiber in the propagation direction of the signal to be amplified, this is typically referred to as "forward pumping." If the pump light is radiated counter to the propagation direction of the signal to be amplified, this is typically referred to as "backward pumping." The laser radiation, which is conducted through the laser-active fiber, experiences a very high amplification due to the large length.

Glass fibers which are to be used for light transmission or for generating laser radiation usually have a fiber core which can consist of pure glass, such as pure quartz glass, or can also have doping. Depending on the size and the numerical aperture of the fiber core, a distinction can be made between single-mode and multi-mode glass fibers. In addition, the fiber core can also have polarization-maintaining properties for the light. The fiber core is usually surrounded radially on the outside by at least one fiber cladding, which is usually closed in the circumferential direction and thus completely surrounds the fiber core, apart from the two open ends of the glass fiber.

The glass fiber is usually surrounded by a fiber coating made of, for example, a polymer comparable to the fiber cladding, which coating can then be considered part of the glass fiber. The fiber coating can be used to mechanically protect the glass interior of the glass fiber and influence the optical properties of the glass fiber. In the case of glass fibers in which the light is guided exclusively in the fiber core (single-clad glass fibers), the fiber coating is usually used primarily for mechanical protection. Glass fibers which guide light in the fiber core and in the fiber cladding (double-clad glass fibers) are usually designed having a fiber coating in order to satisfy mechanical and optical properties.

Two cross-sectional shapes for the fiber cladding that frequently occur in practice are cylindrical and octagonal. The octagonal shape for the fiber cladding is used in particular in the case of active glass fibers.

Glass fibers of this kind can be produced in large lengths and are usually available on reels. The diameter of the fiber cladding usually varies between approx. 80 μm and approx. 1 mm. In practice, in particular in the case of larger fiber diameters, one often speaks of rod-type fibers.

In glass fiber-based optical systems, in particular in laser systems, optical radiation can thus be generated, amplified and transported. In addition, in various uses it may be necessary or at least favorable to discharge optical radiation or optical power from the glass fiber in a safe and controlled manner in order to prevent damage or destruction of the glass fiber based optical system and/or of peripheral devices and/or, for example, of workpieces, analysis samples, measurement objects or persons. In fiber lasers, for example, the non-absorbed optical pump power and/or disruptive optical signal power can usually be discharged from the fiber cladding in a controlled manner by means of a corresponding fiber component.

In the case of fiber-optic beam guidance from the laser to the workpiece, such as in diode, fiber and solid-state lasers, such a fiber-optic component can usually be used for the controlled removal of light located in the fiber cladding instead of in the fiber core. Thus, for example, in a laser diode module having an optical output power of, for example, approx. 2 kW, in the case of a fiber coupling into a glass fiber having a core diameter of, for example, approx. 100 μm, optical power losses of approx. 15% can occur due to the rectangular beam profile (slow/fast axis), which can require handling of an optical power loss of approx. 300 W for a corresponding optical fiber component. In the case of, for example, ytterbium fiber laser systems having a few kW of optical output power that operate at a wavelength of 1 μm, non-absorbed pump light of multiple 100 W usually has to be safely discharged by a corresponding optical fiber component. The safe and targeted discharge of optical radiation from the fiber cladding can also be used in a targeted manner for various uses, for example in medical or lighting technology.

WO 2011 057 908 A1 describes a method for processing a glass fiber such that the glass fiber has a portion for removing the light from the fiber cladding. In this portion of the glass fiber, the fiber coating has been removed and the fiber cladding is exposed radially outward. Groove-like recesses extending in the circumferential direction are introduced into the radially outer surface of the fiber cladding, which recesses can be arranged at the same distance or at different distances from one another along the longitudinal axis of the glass fiber as the elongate direction of extension of the glass fiber. The groove-like recesses can be continuous or interrupted in the circumferential direction.

Since the laser light propagates along the longitudinal axis of the glass fiber, and the groove-like recesses extending in the circumferential direction extend perpendicularly to the longitudinal axis, the laser light impinging on the surfaces of the groove-like recesses can be removed from the fiber cladding in a targeted manner in this region. In this region, the emerging laser light can be absorbed in a targeted manner by a heat sink, and the heat produced by the discharged, absorbed laser light outside the glass fiber can be discharged without being able to cause damage. In the further course of the glass fiber, after the portion for removing the light from the fiber cladding, the laser light traveling in the fiber cladding can be correspondingly reduced or even completely prevented.

A disadvantage of this, however, is that the groove-like recesses of the radially outer surface of the fiber cladding, which extend in the circumferential direction, can weaken the tensile strength of the glass fiber along its longitudinal axis. This can lead to breaking or tearing of the glass fiber. In particular in the case of glass fiber uses which require a high degree of reliability, i.e. require a high degree of resistance to breakage, such as deep-sea fiber optic cables or glass fiber uses for medical technology or for aviation, such a material weakening of the fiber cladding of the glass fiber can present a high risk.

In order to keep such a weakening of the tensile strength of the glass fiber as low as possible in spite of the groove-like recesses extending in the circumferential direction, the groove-like recesses extending in the circumferential direction can be formed so as to have a radial depth which is as small as possible. However, this reduces the above-mentioned desired effect of the groove-like recesses extending in the circumferential direction, i.e. the targeted discharge of the laser light from the fiber cladding. This leads to a conflict of aims of the most efficient discharge of laser light from the fiber cladding and the preservation of the tensile strength of the glass fiber in the region of the groove-like recesses of the radially outer surface of the fiber cladding that extend in the circumferential direction.

Therefore, a method for ablating an optical fiber is known from US 2020/041719 A1 that includes generating a laser beam for a plurality of discrete time periods. The laser beam impinges on the optical fiber and ablates it during each discrete time period. Each discrete impact of the laser beam during one of the plurality of discrete time periods is at a different location on a surface of the cladding. The ablation of the optical fiber during the plurality of discrete time periods forms a plurality of discrete craters or holes which have a predetermined diameter and a predetermined depth and are semicircular or substantially cylindrical in shape. The plurality of discrete craters is spaced apart from one another in an array which extends along a longitudinal axis of the optical fiber and about a circumference of the optical fiber. Between the discrete time periods, either the optical fiber or the source of the laser beam is moved and positioned for the next laser beam.

It is therefore advantageous that the point-like discrete craters or holes can reduce material weakening in comparison with the groove-like recesses of the radially outer surface of the fiber cladding that extend in the circumferential direction from WO 2011 067 908 A1. For this reason, the point-like discrete craters or holes from US 2020/041719 A1 can also be formed relatively deeply radially toward the fiber core, without excessively reducing the tensile strength.

The disadvantage in this case, however, is that, even in the case of a radially relatively deep formation of the point-like discrete craters or holes from US 2020/041719 A1 toward the fiber core, the discharge effect of the discrete craters or holes, as a result of their semicircular or substantially cylindrical shape, is still less than the discharge effect of the groove-like recesses of the radially outer surface of the fiber cladding that extend in the circumferential direction from WO 2011 067 908 A1, which groove-like recesses form a significantly larger surface area perpendicular to the propagation direction of the laser light in the fiber cladding, which can lead to the laser light being discharged from the fiber cladding.

By means of a high number or density of craters or holes from US 2020/041719 A1 and/or radially very deep formation thereof toward the fiber core, the overall effect of said craters or holes can possibly be increased and the effect of the groove-like recesses of the radially outer surface of the fiber cladding that extend in the circumferential direction, which are described in WO 2011 067 908 A1, can be approximated. However, this can lead to a significant mechanical weakening of the stability of the fiber cladding, in particular in the longitudinal direction of the glass fiber. In other words, the lower efficiency of the craters or holes from US 2020/041719 A1 in comparison with the groove-like recesses extending in the circumferential direction from WO 2011 067 908 A1 can be at least partially compensated for by a high spatial density of holes. However, this can significantly restrict or reduce the mechanical stability of the glass fiber.

An object of the present invention is to provide a glass fiber of the type described at the outset, such that the possibilities for removing light from the fiber cladding can be improved and/or expanded. The tensile strength of the glass fiber is in particular to be maintained as far as possible along the elongate direction of extension thereof at the same time. An alternative to known glass fibers of this type is to be provided at least.

The object is achieved according to the invention by a glass fiber having the features of claim 1 and by a glass fiber product having the features of claim 22. Advantageous developments are described in the dependent claims.

The present invention thus relates to a glass fiber comprising at least one fiber core, at least one fiber cladding which at least substantially encloses the fiber core in the circumferential direction and along the longitudinal axis, and at least one fiber coating which substantially encloses the fiber cladding in the circumferential direction and along the longitudinal axis, the glass fiber having at least one first exposed portion where the fiber cladding is exposed by the fiber coating for removing light at least from the fiber cladding, the fiber cladding, at least, having a plurality of recesses at least substantially in the radial direction, which recesses are designed to at least partially discharge the light at least from the fiber cladding.

The glass fiber according to the invention is characterized in that the recesses, as longitudinal recesses, are each formed at least in portions precisely along the longitudinal axis.

In other words, the recesses of the glass fiber according to the invention are formed so as to extend, at least in portions, exclusively along the longitudinal axis of the glass fiber as the elongate direction of extension thereof. This can be achieved by a relative movement between the glass fiber and the tool for introducing the recesses, which movement takes place exclusively along the longitudinal axis of the glass fiber.

The present invention is based on the knowledge that the surface area of the longitudinal recesses, by means of which light can at least be discharged to the outside at least from the fiber cladding of the glass fiber, can be increased in this way compared to the cylindrical craters or holes from US 2020/041719 A1 without reducing the material at least of the fiber cladding in the circumferential direction, i.e. perpendicular to the longitudinal axis. In this way, a further weakening of the mechanical stability of the glass fiber along the longitudinal axis can be prevented and the discharge of light to the outside at least from the fiber cladding of the glass fiber can be increased.

In this case, the discharge of light at least from the fiber cladding of the glass fiber can take place, in a comparable manner to the cylindrical craters or holes from US 2020/041719 A1, on the front face of the longitudinal recesses, which faces the propagation direction of the light at least in the fiber cladding along the longitudinal axis. In addition, at least the base or the bottom of the longitudinal recesses, which extends along the longitudinal axis and faces the fiber core radially, can be used to discharge light at least from the fiber cladding of the glass fiber. This can, in particular compared to the cylindrical craters or holes from US 2020/041719 A1, increase the surface area which can be effective for discharging light at least from the fiber cladding of the glass fiber. At the same time, the longitudinal recesses can have an extension in the circumferential direction which can be comparable to the cylindrical craters or holes from US 2020/041719 A1, such that a weakening of the mechanical stability of the glass fiber in the circumferential direction that is comparable with and, in particular no greater than, the weakening caused by cylindrical craters or holes from US 2020/041719 A1 can be caused by the longitudinal recesses.

A glass fiber according to the invention can thus be provided which has mechanical properties which are at least comparable with the cylindrical craters or holes from US 2020/041719 A1, but which, due to the elongate extension of the longitudinal recesses along the longitudinal axis, can provide a larger effective surface area between the material of at least the fiber cladding and the surroundings, which can be used to discharge light at least from the fiber cladding.

For this purpose, the longitudinal recesses can be introduced at least into the fiber cladding precisely in the radial direction and obliquely with respect to the radial direction. The longitudinal recesses can also extend obliquely or rectilinearly in the circumferential direction in portions in the elongate course thereof. In any case, however, the longitudinal recesses extend at least in portions precisely along the longitudinal axis of the glass fiber and preferably directly radially. The longitudinal recesses can also be implemented in combination with other recesses, such as the known grooves extending in the circumferential direction from WO 2011 067 908 A1 and/or the point-like craters or holes from US 2020/041719 A1. This can increase the design possibilities. In order to utilize the previously described advantages of longitudinal recesses according to the invention, however, it can be advantageous to design the recesses of at least the fiber cladding exclusively as longitudinal recesses.

According to one aspect of the invention, the longitudinal recesses are each formed completely precisely along the longitudinal axis and/or completely precisely in the radial direction. This can maximize the implementation and use of the previously described properties and advantages of longitudinal recesses according to the invention. This can also simplify the introduction of the longitudinal recesses according to the invention at least into the fiber cladding, since this can be carried out by a relative movement between the glass fiber and the tool exclusively along the longitudinal axis of the glass fiber, and/or oriented precisely radially with respect to the glass fiber.

According to a further aspect of the invention, the longitudinal recesses each have a width in the circumferential direction that corresponds to the width of a tool by means of which the longitudinal recesses were introduced at least into the fiber cladding. Such a tool can be a laser beam, a milling tool or the like. As a result, it can be achieved in a simple manner that the longitudinal recesses can be formed so as to extend completely along the longitudinal axis at least in portions.

According to a further aspect of the invention, at least some of the longitudinal recesses are differently spaced apart from one another in the circumferential direction and/or along the longitudinal axis. This can increase the design possibilities of the effect of longitudinal recesses with regard to discharging light at least from the fiber cladding to the outside.

According to a further aspect of the invention, the longitudinal recesses are increasingly spaced apart from one another along the longitudinal axis in the propagation direction of the light. This can increase the design possibilities of the effect of longitudinal recesses with regard to discharging light at least from the fiber cladding to the outside this way it can in particular be taken into account that light can already be discharged at least from the fiber cladding into the surroundings by the first longitudinal recesses, on which the light can impinge at least in the fiber cladding along the longitudinal axis, and the light can thus be reduced at least in the fiber cladding. The longitudinal recesses which follow along the longitudinal axis in the propagation direction of the light, at least in the fiber cladding, can thus be spaced further apart, since, in the further course of the glass fiber, increasingly less light can be discharged at least from the fiber cladding. At the same time, this can keep the outlay for introducing the longitudinal recesses into the glass fiber low.

According to a further aspect of the invention, at least some of the longitudinal recesses are uniformly spaced apart from one another in the circumferential direction and/or along the longitudinal axis. This can increase the design possibilities of the effect of longitudinal recesses with regard to discharging light at least from the fiber cladding to the outside. In particular, this can bring about a discharge of light at least from the fiber cladding in the circumferential direction and/or along the longitudinal axis that is as uniform as possible.

According to a further aspect of the invention, at least one first longitudinal recess has a first length along the longitudinal axis and at least one second longitudinal recess has a second length along the longitudinal axis, the first length and the second length being different. This can increase the design possibilities of the effect of longitudinal recesses with regard to discharging light at least from the fiber cladding to the outside.

According to a further aspect of the invention, at least one first longitudinal recess has a first width in the circumferential direction and at least one second longitudinal recess has a second width in the circumferential direction, the first width and the second width being different. This can increase the design possibilities of the effect of longitudinal recesses with regard to discharging light at least from the fiber cladding to the outside.

According to a further aspect of the invention, at least one first longitudinal recess has a first depth in the radial direction and at least one second longitudinal recess has a second depth in the radial direction, the first depth and the second depth being different. This can increase the design possibilities of the effect of longitudinal recesses with regard to discharging light at least from the fiber cladding to the outside.

According to a further aspect of the invention, the first exposed portion is surrounded by a heat sink at least in portions, preferably completely, so as to be in contact or spaced apart, the heat sink, facing the exposed portion, being designed at least in portions to absorb and/or reflect the light at least from the fiber cladding. Such a heat sink can be formed by at least one arbitrary body which is able to receive the light discharged at least from the fiber cladding in an absorbing and/or reflecting manner, and thus keep said light away from the glass fiber and from the surroundings. The heat sink can in particular be a body made of metal or plastics material, which can absorb the light discharged at least from the fiber cladding and store it as heat and/or, for example by means of cooling fins or the like oriented outwardly away from the glass fiber, can release it into the surroundings away from the glass fiber. For this purpose, the body can in particular have a black, matte coating facing the first exposed portion of the glass fiber, which coating can promote the absorption of light. This can also be carried out in a touching or distanced manner by the body.

According to a further aspect of the invention, the glass fiber has at least one second exposed portion where the fiber cladding is exposed by the fiber coating for discharging light at least from the fiber cladding, the first exposed portion and the second exposed portion being arranged at least in portions, preferably completely, at an angle to one another, preferably parallel to one another. In this way, the properties and advantages described above can be implemented at two portions which are spaced apart from one another along the longitudinal axis of the glass fiber. As a result, each of the two exposed portions can be shorter along the longitudinal axis without limiting the effect as a whole.

In particular, the glass fiber can extend at an angle between the two exposed portions in the elongate extension thereof along the longitudinal axis, such that a comparatively compact arrangement of the two exposed portions of the glass fiber can be achieved. For this purpose, the two exposed portions can in particular be bent at right angles to one another and very particularly in U-shaped manner and can be arranged to extend in parallel with one another, which can particularly reduce the installation space of the glass fiber in this region of its elongate extension. As a result, the glass fiber having the two exposed portions, in particular in the case of an arrangement extending in parallel, can form a comparatively compact glass fiber component, by means of which the properties and advantages described above can be implemented.

According to a further aspect of the invention, the glass fiber has an optical element which is arranged at an open end of the fiber core and forms an open end of the glass fiber along the longitudinal axis. Such an optical element can also be referred to as an optical window and can be designed as an optical lens, for example. By means of such an optical element, the light traveling in the fiber core can be coupled out of the glass fiber in a predetermined manner and thus emitted to the outside at the end of the glass fiber. The optical element can in this case be used to guide the light of the fiber core and/or to mechanically connect the glass fiber to a component which conveys the light. In particular, the laser beam diameter, as light of the fiber core, can be expanded by means of the optical element in the form of an optical window, or the laser beam, as light of the fiber core, can be collimated by means of the optical element in the form of an optical lens, for example.

According to a further aspect of the invention, at least some of the longitudinal recesses extend in the radial direction into the fiber core. In this way, light from the fiber core can also be discharged from there to the outside, which can be necessary or useful for specific uses. This can further increase the freedom of design of the glass fiber according to the invention.

According to a further aspect of the invention, at least some of the longitudinal recesses, preferably all of the longitudinal recesses, have a plurality of elevations, at least in portions, preferably completely, at least on the base thereof. These elevations are also designed to discharge light at least from the fiber cladding to the outside. For this purpose, the elevations can be integrally bonded to the material of the fiber cladding.

This aspect of the present invention is based on the knowledge that, by outwardly enlarging the surface of at least the fiber cladding by means of elevations, the surface area at which light can be discharged at least from the fiber cladding to the outside can be increased or an additional surface area can be provided. This can promote the discharge of light at least from the fiber cladding to the outside. Arranging the elevations within the longitudinal recesses on the base or on the bottom thereof can in particular promote the discharge of light at least from the fiber cladding there.

According to a further aspect of the invention, the outer surface of the fiber cladding has a plurality of elevations at least directly next to at least some of the longitudinal recesses, preferably next to all longitudinal recesses, at least in portions, preferably completely. This can make it possible to also use the elevations described above on the outer surface of the fiber cladding in order to additionally discharge light there at least from the fiber cladding to the surroundings. Depending on the material, thickness, shape, distribution, refractive index and other properties, the elevations can contribute significantly to the discharge of undesired laser radiation as light at least from the fiber cladding of the glass fiber without reducing the tensile strength of the glass fiber. As a result, the elevations can significantly increase the efficient discharge of light and the longitudinal recesses can thus be minimized, which can contribute to a further increase in the tensile strength of the glass fiber.

According to a further aspect of the invention, the elevations of the same longitudinal recess and/or of a plurality of longitudinal recesses are at least partially, preferably completely, identical or different in terms of material, thickness, refractive index, shape, distribution and/or density. This can increase the freedom of design for the formation of the elevations described above.

According to a further aspect of the invention, at least some of the elevations, preferably all of the elevations, are formed by fiber cladding material which is generated by at least one tool when the longitudinal recesses are introduced at least into the fiber cladding. For this purpose, the process parameters for introducing the longitudinal recesses can be adjusted in a targeted manner with respect to one another, in order to remove any or a sufficient amount of fiber cladding material and at the same time apply said material to the base of the longitudinal recess and/or to the outside of the fiber cladding as elevations. A laser beam can in particular be used as a tool for this purpose. In this case, a targeted adjustment of the process parameters for introducing the longitudinal recesses may be necessary in order to be able to process and use the fiber cladding material in this way at all, since, when the longitudinal recesses are introduced at least into the material of the fiber cladding, the removed fiber cladding material usually evaporates or vaporizes, and no fiber cladding material at all can form the elevations described above, or only to an insufficiently small extent.

This aspect of the invention is based on the knowledge that introducing the longitudinal recesses at least into the fiber cladding of the glass fiber, for example by means of a tool in the form of a laser beam, with a corresponding conscious choice of the process parameters, can lead to material removal of fiber cladding material. The processing parameters can in this case be selected such that fiber cladding material is released that can settle on and adhere to the base or bottom of the longitudinal recesses and/or on the outer surface of the fiber cladding at least directly next to the longitudinal recesses. Due to the heating of the fiber cladding material by the laser machining, the fiber cladding material can in particular have a sufficiently high temperature or viscosity, in particular at this moment, in order to integrally adhere to the non-ablated heated fiber cladding material of the base or the bottom of the longitudinal recesses and/or to the outer surface of the fiber cladding, at least directly next to the longitudinal recesses, and to harden there.

As a result, the elevations described above can be formed directly on the base or on the bottom of the longitudinal recesses and/or on the outer surface of the fiber cladding by introducing the longitudinal recesses into the glass fiber, such that an additional processing step can be prevented for this purpose. At the same time, the elevations can be made from the same material as the fiber cladding. This can promote a stable hold of the elevations on the material of the fiber cladding. This can apply in a comparable manner to the base or to the bottom of longitudinal recesses if the longitudinal recesses protrude radially into the fiber core.

According to a further aspect of the invention, at least one longitudinal recess, preferably a plurality of longitudinal recesses, particularly preferably all longitudinal recesses, at least in portions, preferably completely, has at least one material filling, preferably a plurality of different material fillings, the material of the material filling differing from the material of the fiber core and/or from the material of the fiber cladding. A material or a material filling is understood to mean an engineering material and in particular not a gas such as air.

This aspect of the invention is based on the concept that the removal of light at least from the fiber cladding of the glass fiber can be promoted by the longitudinal recess, which can be filled with gas, in particular with air, instead being filled at least in portions or partially and preferably completely with at least one material as a substance, which differs from the material of the fiber core or the fiber cladding of the glass fiber. As a result, the removal or discharge of at least the cladding light to the outside can additionally be influenced in a targeted manner and in particular improved.

In this case, the longitudinal recess can be filled in portions or partially along the elongate extension in the direction of the longitudinal axis and/or perpendicularly thereto in width and/or height with at least one material. This can take place in an identical or different manner for a plurality of longitudinal recesses or all longitudinal recesses. Different materials can also be combined with one another per longitudinal recess as material fillings. Furthermore, the relative filling, in portions or partially, in the direction of the longitudinal axis and/or perpendicularly thereto in width and/or height can be configured as desired for the different materials and in particular can be the same or different for a plurality of or all of the longitudinal recesses.

According to a further aspect of the invention, the material of the material filling has a refractive index which promotes the removal of light at least from the fiber cladding. This can promote the implementation of the properties and advantages of the material filling that are described above.

According to a further aspect of the invention, at least two longitudinal recesses, preferably all of the longitudinal recesses, are filled with the material filling to different lengths, widths and/or heights. This can increase the design possibilities for the material filling.

According to a further aspect of the invention, at least two longitudinal recesses, preferably all of the longitudinal recesses, have different materials of the material filling. This can increase the design possibilities for the material filling.

The present invention also relates to a glass fiber product comprising at least one glass fiber as described above. A glass fiber product can be any product or any device in which a glass fiber according to the invention can be used as intended. In particular, these can be products or devices of laser technology, measurement technology, medical technology and the like, as described at the outset. Such a glass fiber product can be an end product for use by a user and/or an intermediate product or a component of such an end product. In this way, the properties and advantages of a glass fiber according to the invention can be implemented and used.

A plurality of embodiments and further advantages of the invention are illustrated purely schematically and explained in greater detail below in connection with the following drawings, in which:

FIG. 21 is a longitudinal section through a glass fiber according to the invention according to a ninth embodiment;

FIG. 22 is a cross section of the glass fiber from FIG. 21.

The above drawings are viewed in cylindrical coordinates. A longitudinal axis X extends. A radial direction R extends away from the longitudinal axis X, perpendicularly to the longitudinal axis X. A circumferential direction U extends perpendicularly to the radial direction R and about the longitudinal axis X.

Figure 1:
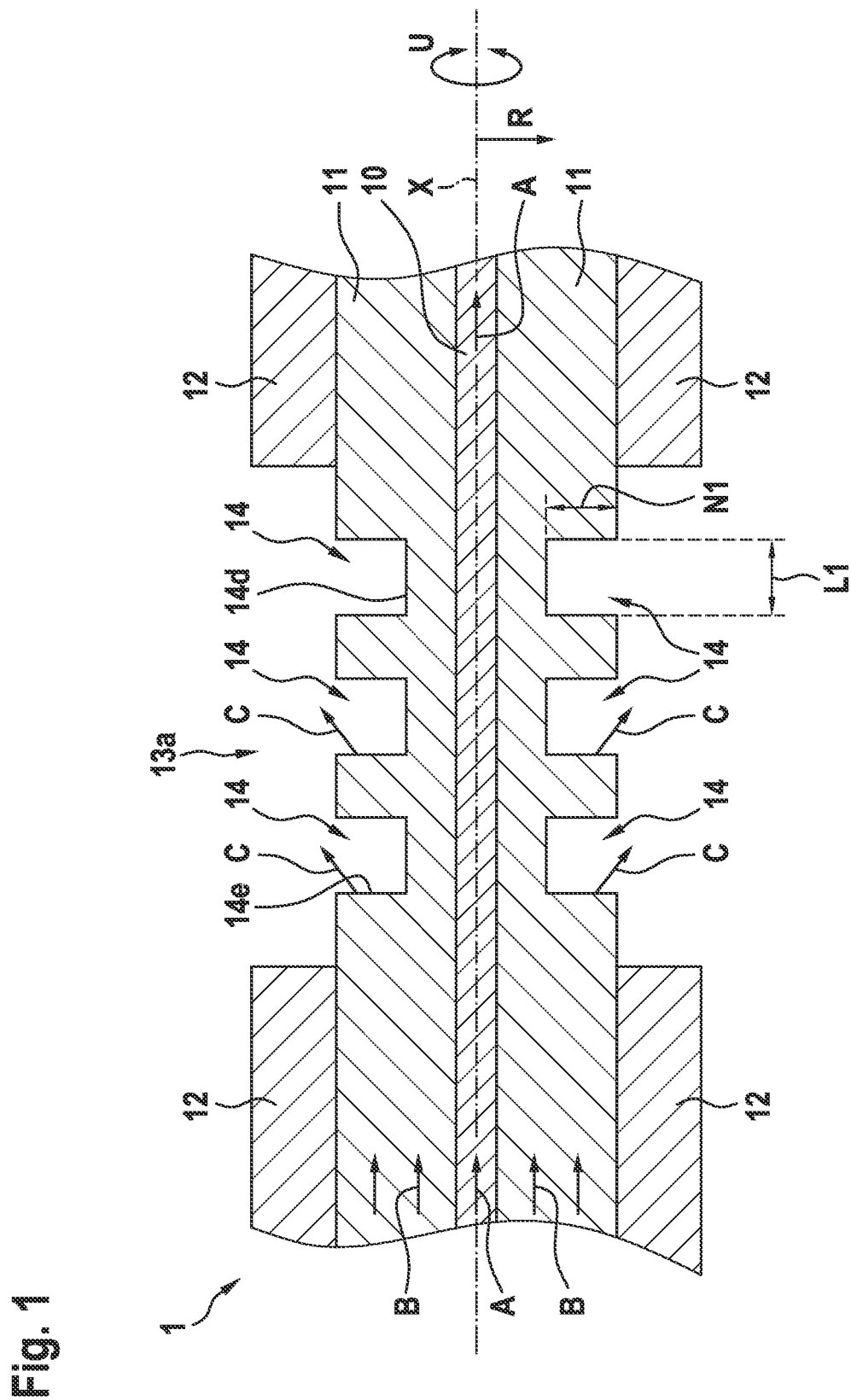
FIG. 1 is a longitudinal section through a glass fiber according to the invention according to a first embodiment.
Figure 2:
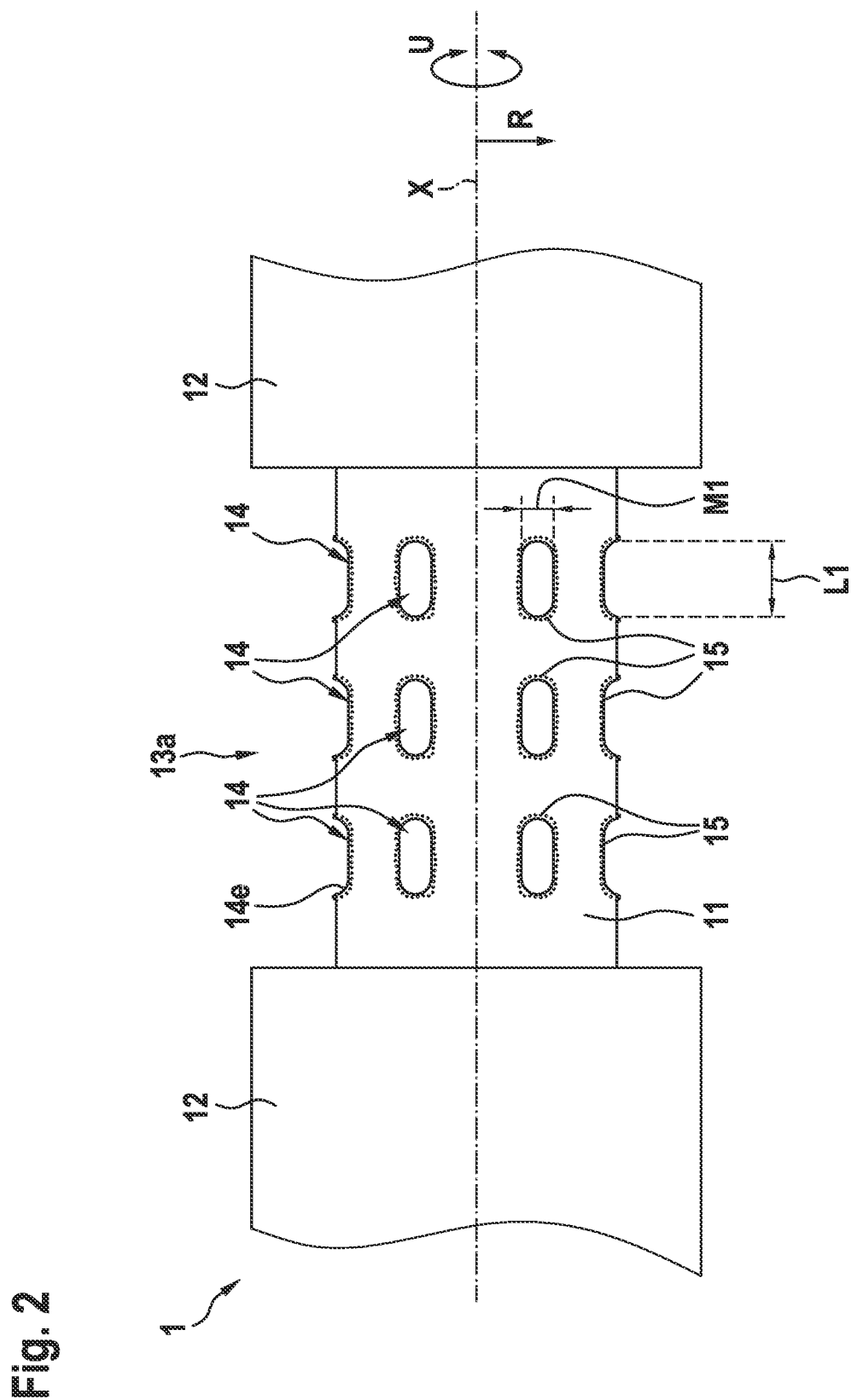
FIG. 2 is a lateral view of the glass fiber from FIG. 1.
Figure 3:
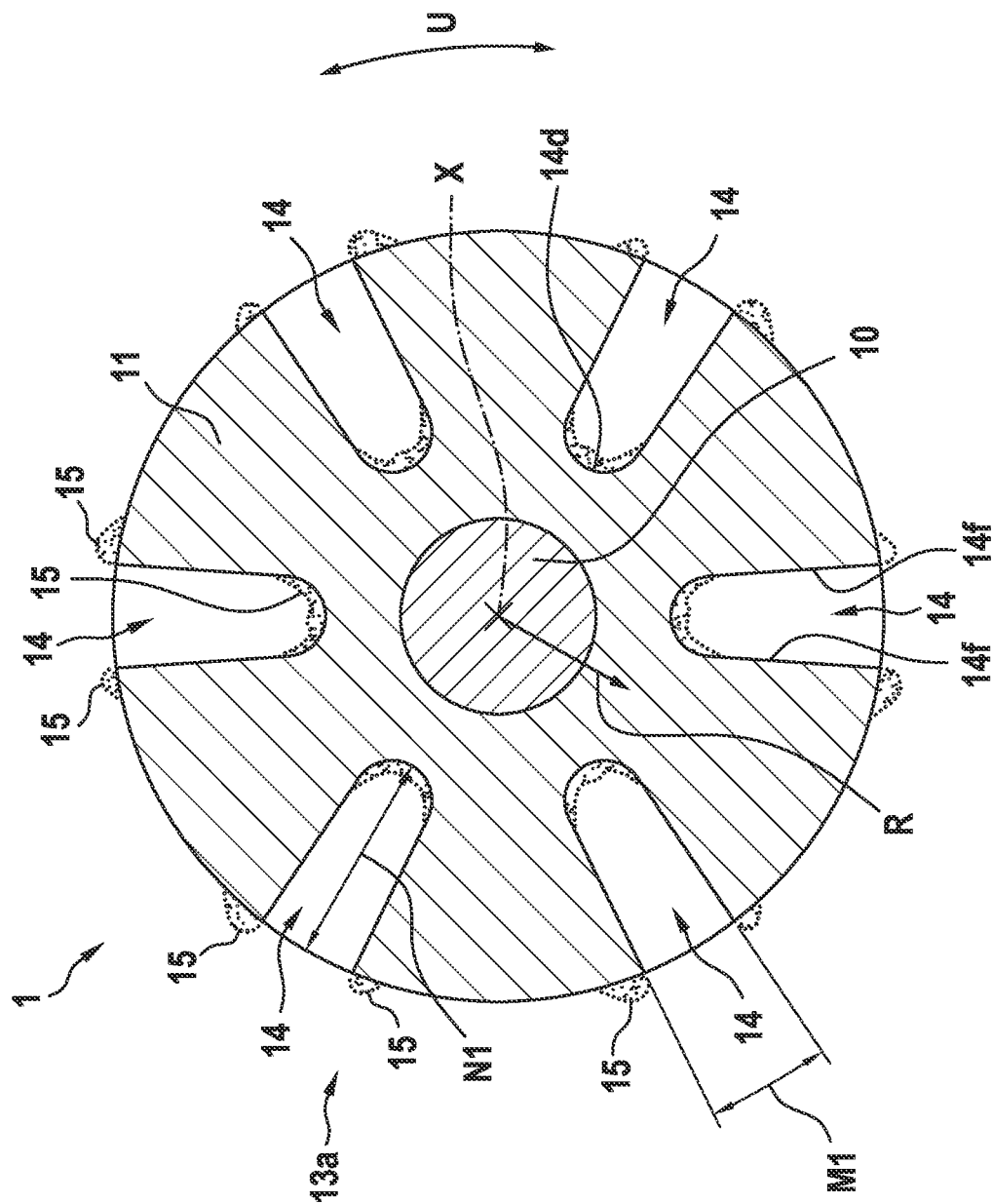
FIG. 3 is a cross section of the glass fiber from FIG. 1.
Figure 4:
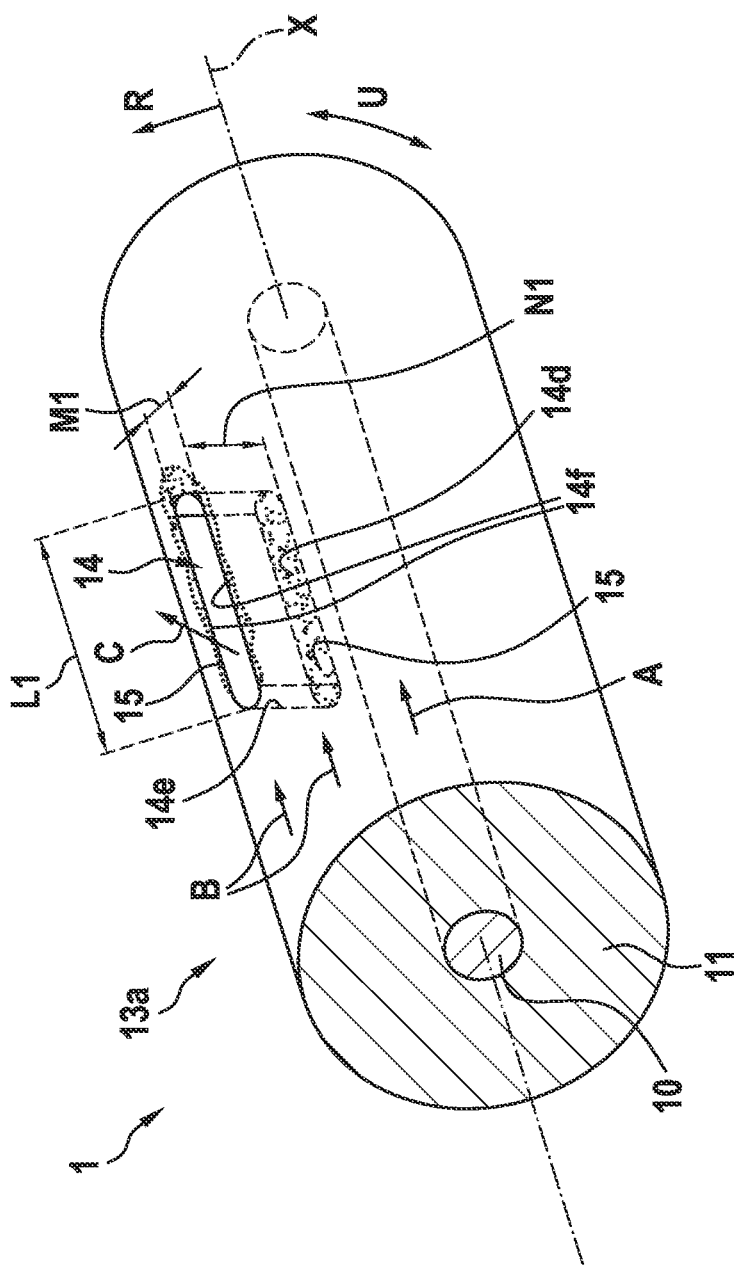
FIG. 4 is a perspective view of the glass fiber from FIG. 1 with only one exemplary longitudinal recess.

FIG. 1 is a longitudinal section through a glass fiber 1 according to the invention according to a first embodiment. FIG. 2 is a lateral view of the glass fiber 1 from FIG. 1. FIG. 3 is a cross section of the glass fiber 1 from FIG. 1. FIG. 4 is a perspective view of the glass fiber 1 from FIG. 1 with only one exemplary longitudinal recess 14.

A glass fiber 1 extends along the longitudinal axis X and has a cylindrical shape. The glass fiber 1 has a fiber core 10 which is arranged in the center. The fiber core 10 consists of a quartz glass. The fiber core 10 is completely enclosed in the radial direction R by a fiber cladding 11. The fiber cladding 11 extends cylindrically about the fiber core 10 along the longitudinal axis X. The fiber cladding 11 is enclosed radially on the outside by a fiber coating 12. The fiber coating 12 consists of a polymeric material, n the fiber core 10, light A can propagate as core light A along the longitudinal axis X. In the illustration in FIG. 1, the core light A propagates from left to right. In a comparable manner, light B propagates in the fiber cladding 11 as cladding light B.

The glass fiber 1 has a first exposed portion 13a in which the fiber coating 12 is removed from the fiber cladding 11 in the circumferential direction U and along the longitudinal axis X. In this first exposed portion 13a, a plurality of recesses 14 in the form of longitudinal recesses 14 are introduced into the fiber cladding 11 along the longitudinal axis X radially from the outside. According to the first embodiment of FIG. 1 to 4, the longitudinal recesses 14 are identical. The longitudinal recesses 14 each have a first length L1, a first width M1 and a first depth N1. The longitudinal recesses 14 are in this case uniformly distributed in the circumferential direction U and are arranged at a distance from one another. The longitudinal recesses 14 are also uniformly spaced apart from one another along the longitudinal axis X.

The longitudinal recesses 14 each have a base 14d at their radially deepest point, which can also be referred to as the bottom 14d of the longitudinal recesses 14. The two lateral surfaces 14e extend radially outward from the base 14d of each longitudinal recess 14. Facing the core light A, a front face 14f extends radially from the base 14d or from the bottom 14d to the outer surface of the longitudinal recesses 14, see, for example, FIG. 4.

On the base 14d of each longitudinal recess 14 there is a plurality of elevations 15 which are formed by glass dust 15 as fiber cladding material 15 and point at least substantially radially outward. Likewise, the edges of each longitudinal recess 14 along the longitudinal axis X are covered by elevations 15 in the form of glass dust 15 as fiber cladding material 15. The elevations 15 extend laterally in the circumferential direction U on both sides of each longitudinal recess 14 along the longitudinal axis X in the propagation direction of the core light A and facing away from the propagation direction of the cladding light B.

The introduction of the longitudinal recesses 14 into the fiber cladding 11 can be achieved from directly radially outside using a laser beam as a machining tool. In this case, a laser beam of a certain width in the circumferential direction U can be used and moved along the longitudinal axis X on the fiber cladding 11. Likewise, the fiber cladding 11 can additionally or alternatively be moved along the longitudinal axis X relative to the laser, as the machining tool. The intensity of the laser beam and the speed of movement along the longitudinal axis X can be used to produce the width M1, M2 of the longitudinal recesses 14 in the circumferential direction U, the depth N1, N2 thereof in the radial direction R and the length L1, L2, L3 thereof along the longitudinal axis X. In order to produce further longitudinal recesses 14, the laser beam, as the machining tool, has to be repositioned relative to the fiber cladding 11. As a result, the longitudinal recesses 14 can be formed identically and, as described above, arranged so as to be uniformly distributed, as corresponds to the first embodiment of FIGS. 1 to 4. The longitudinal recesses 14 can, however, also be arranged and/or formed differently in this way, as will be described with reference to the following embodiments.

According to the invention, the cladding light B can thus impinge on the front face 14e of the longitudinal recesses 14 and be discharged there from the fiber cladding 11 to the outside. As a result, a discharge of cladding light B from the fiber cladding 11 can be achieved. At the same time, the stability of the fiber cladding 11 can be reduced to a comparatively low extent. This can be achieved by the recesses 14, as longitudinal recesses 14, extending precisely along the longitudinal axis X. Weakening of the material of the fiber cladding 11 in the circumferential direction U can thus be prevented as far as possible. Due to the elongate extension of the longitudinal recesses 14 along the longitudinal axis X, a comparatively great effect can be achieved compared to known punctiform holes or craters as recesses 14.

The cladding light B can also impinge on the elevations 15 and be discharged from the fiber cladding 11 at these points. As a result, an additional discharge of cladding light B, as removed cladding light C, from the fiber cladding 11 can be achieved.

Figure 5:
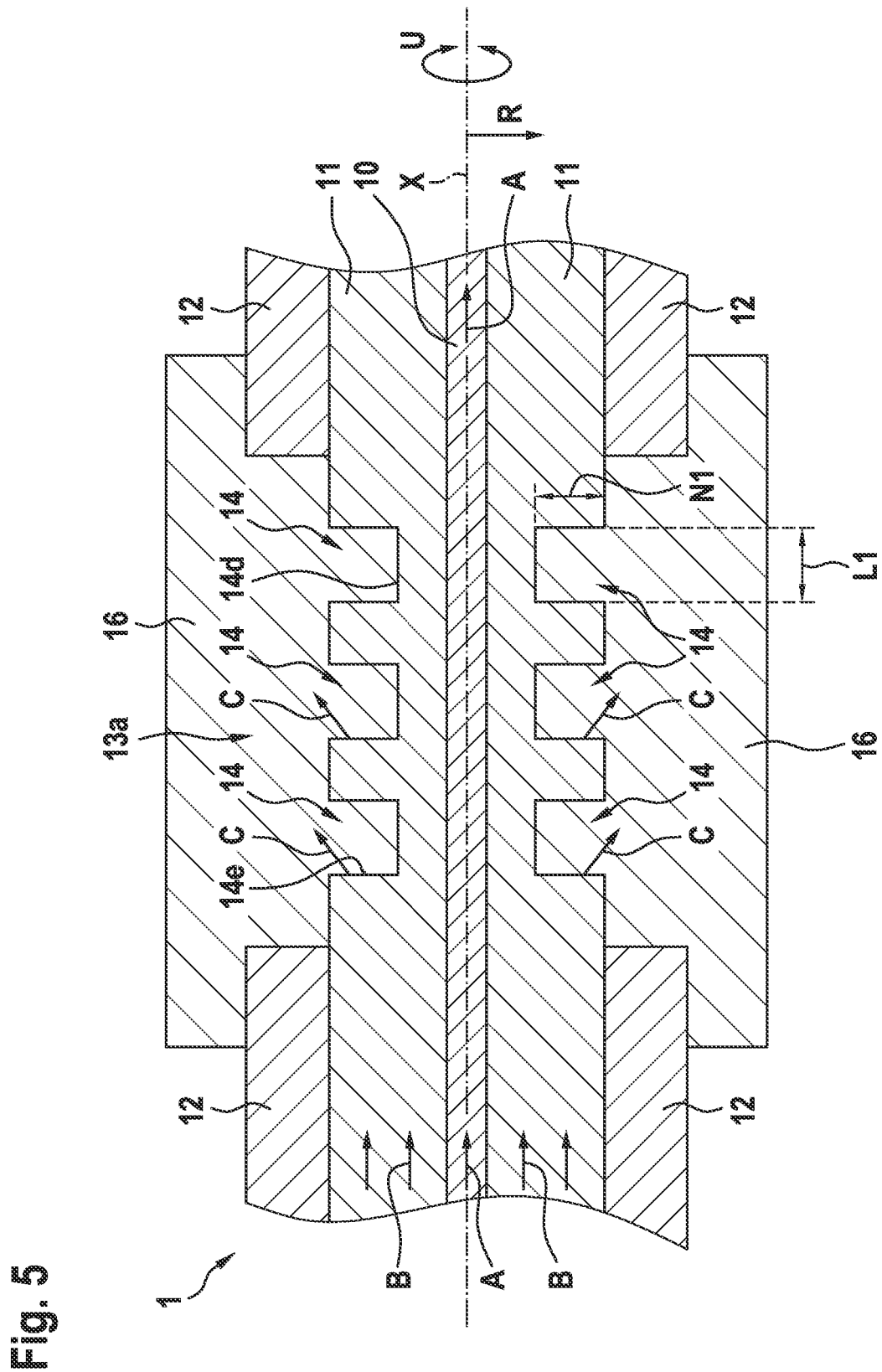
FIG. 5 is a longitudinal section through a glass fiber according to the invention according to a second embodiment.
Figure 6:
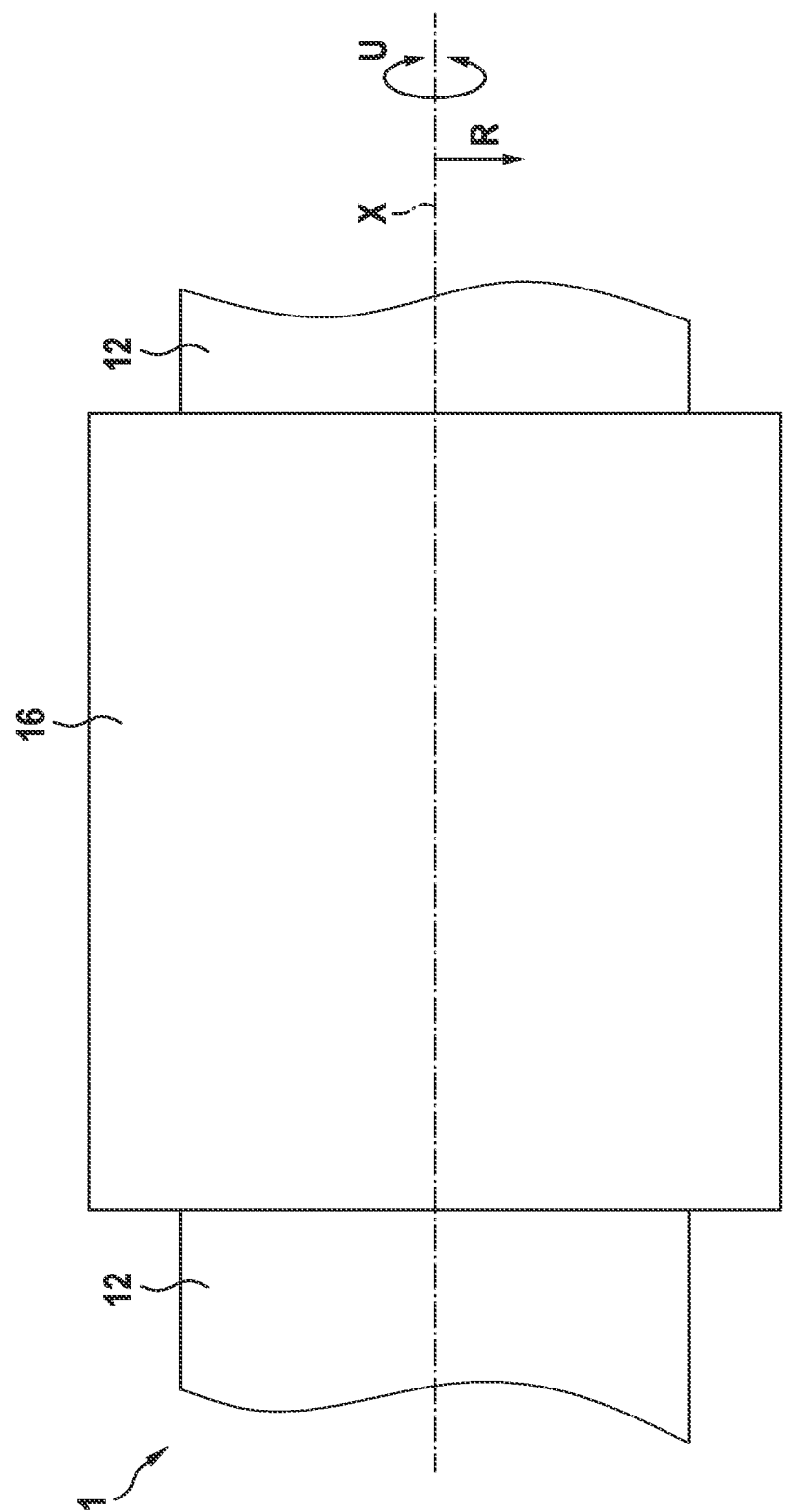
FIG. 6 is a lateral view of the glass fiber from FIG. 5.

FIG. 5 is a longitudinal section through a glass fiber 1 according to the invention according to a second embodiment. FIG. 6 is a lateral view of the glass fiber 1 from FIG. 5.

According to the second embodiment, the glass fiber 1, or the first exposed portion 13a thereof, is surrounded by a heat sink 16 in the form of a housing 16. The housing 16 in this case encloses the first exposed portion 13a and the adjoining regions of the fiber coating 12. The longitudinal recesses 14 are in particular filled by the material of the housing 16. In this way, the removed cladding light C can be absorbed by the housing 16. As a result, the heat that can be generated by the removed cladding light C can be absorbed by the housing 16, as a result of which the corresponding heat can be kept away from the surroundings.

Figure 7:
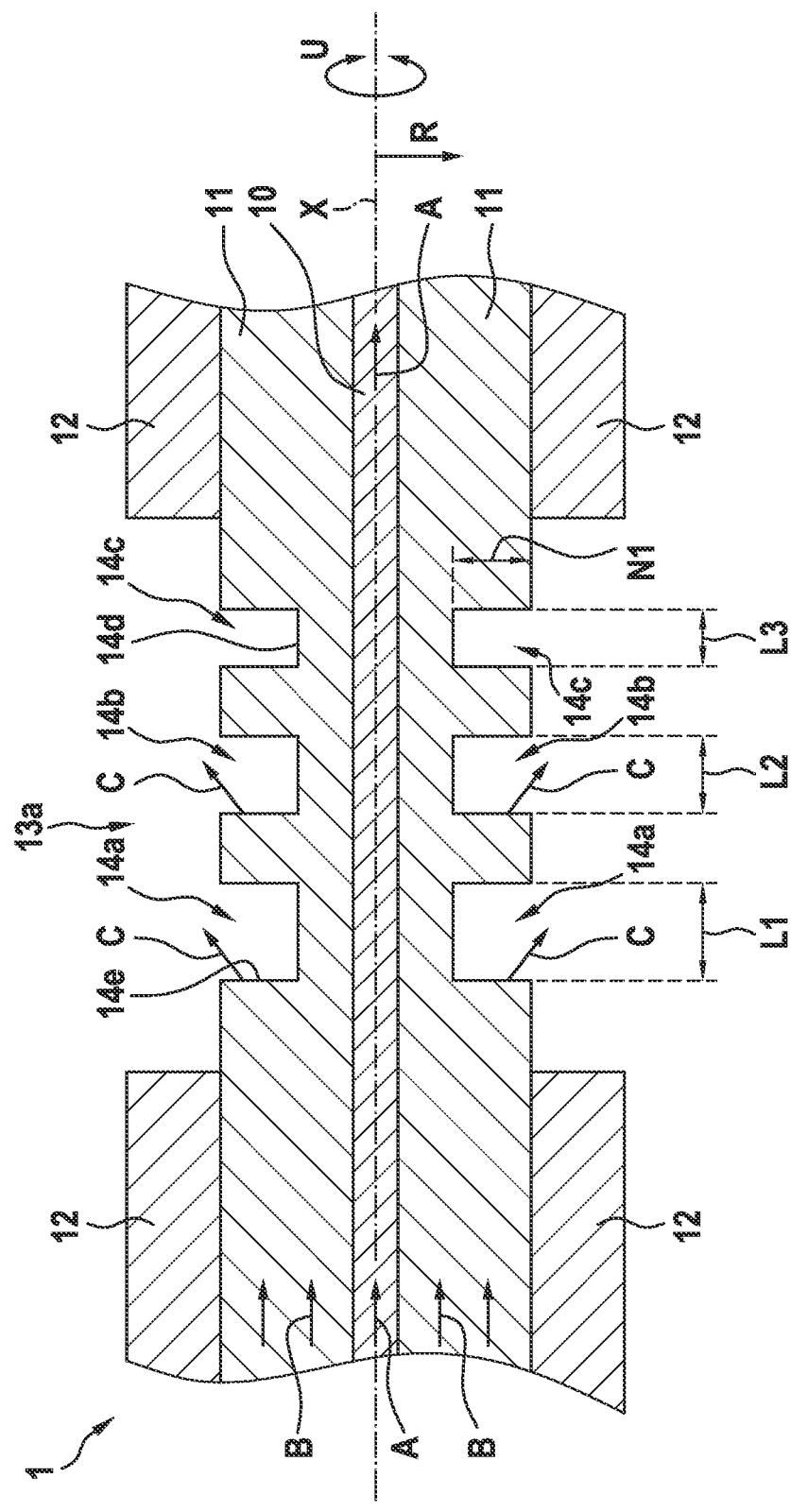
FIG. 7 is a longitudinal section through a glass fiber according to the invention according to a third embodiment.
Figure 8:
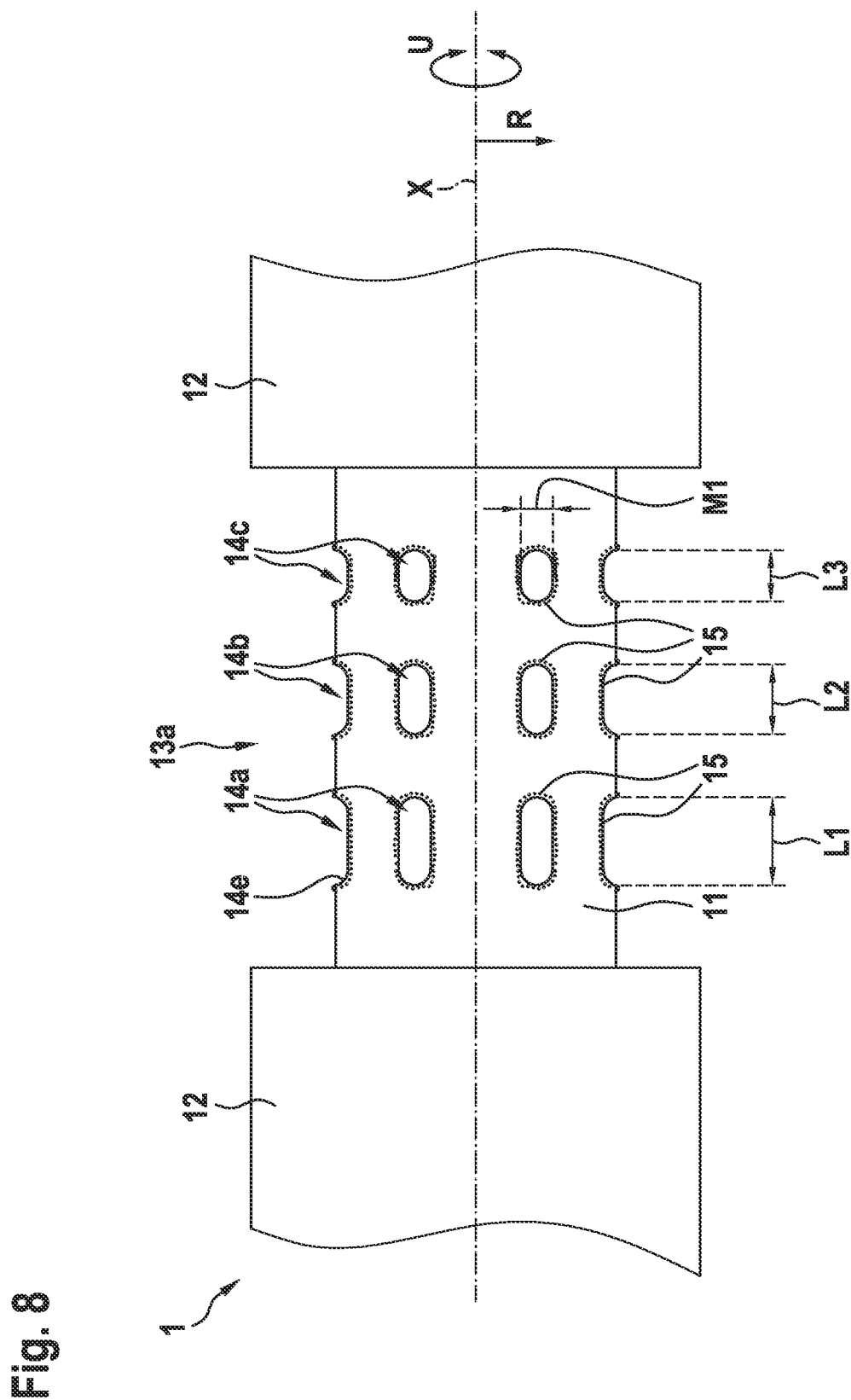
FIG. 8 is a lateral view of the glass fiber from FIG. 7.

FIG. 7 is a longitudinal section through a glass fiber 1 according to the invention according to a third embodiment. FIG. 8 is a lateral view of the glass fiber 1 from FIG. 7.

According to the third embodiment, the longitudinal recesses 14 are formed in different lengths L1, L2, L3 along the longitudinal axis X. Viewed from the direction of the core light A and the cladding light B, the longitudinal recesses 14 are first formed as first longitudinal recesses 14a having the longest, first length L1. The length of the longitudinal recesses 14 is shortened in the further course along the longitudinal axis X to a middle, second length L2 of the second longitudinal recesses 14b and finally to a third, shortest length L3 of the third longitudinal recesses 14c. In this way, the discharge of cladding light B as removed cladding light C can be varied in the course of the first exposed portion 13a. All of the longitudinal recesses 14 have the same first width M1 and the same first depth N1.

Figure 9:
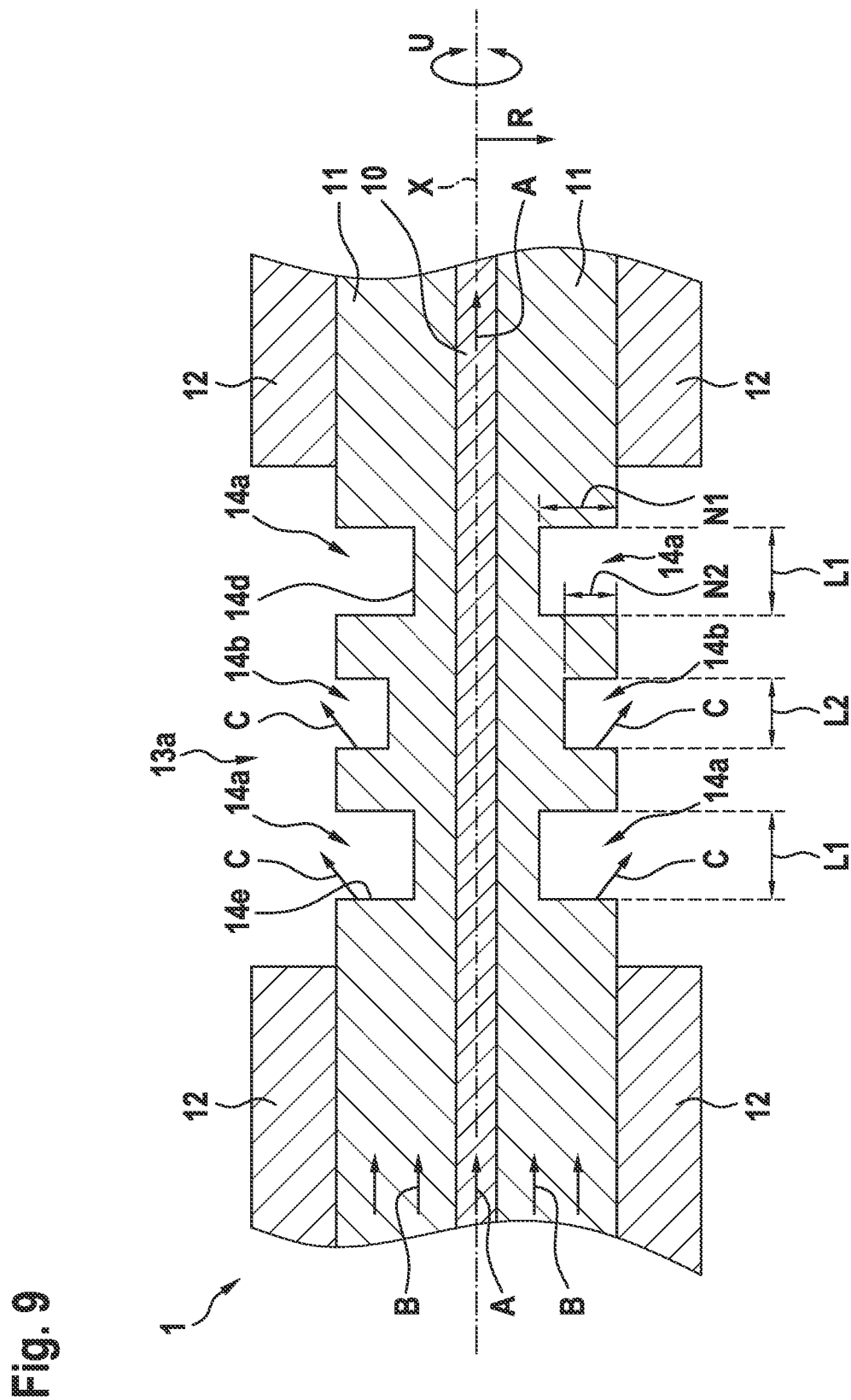
FIG. 9 is a longitudinal section through a glass fiber according to the invention according to a fourth embodiment.
Figure 10:
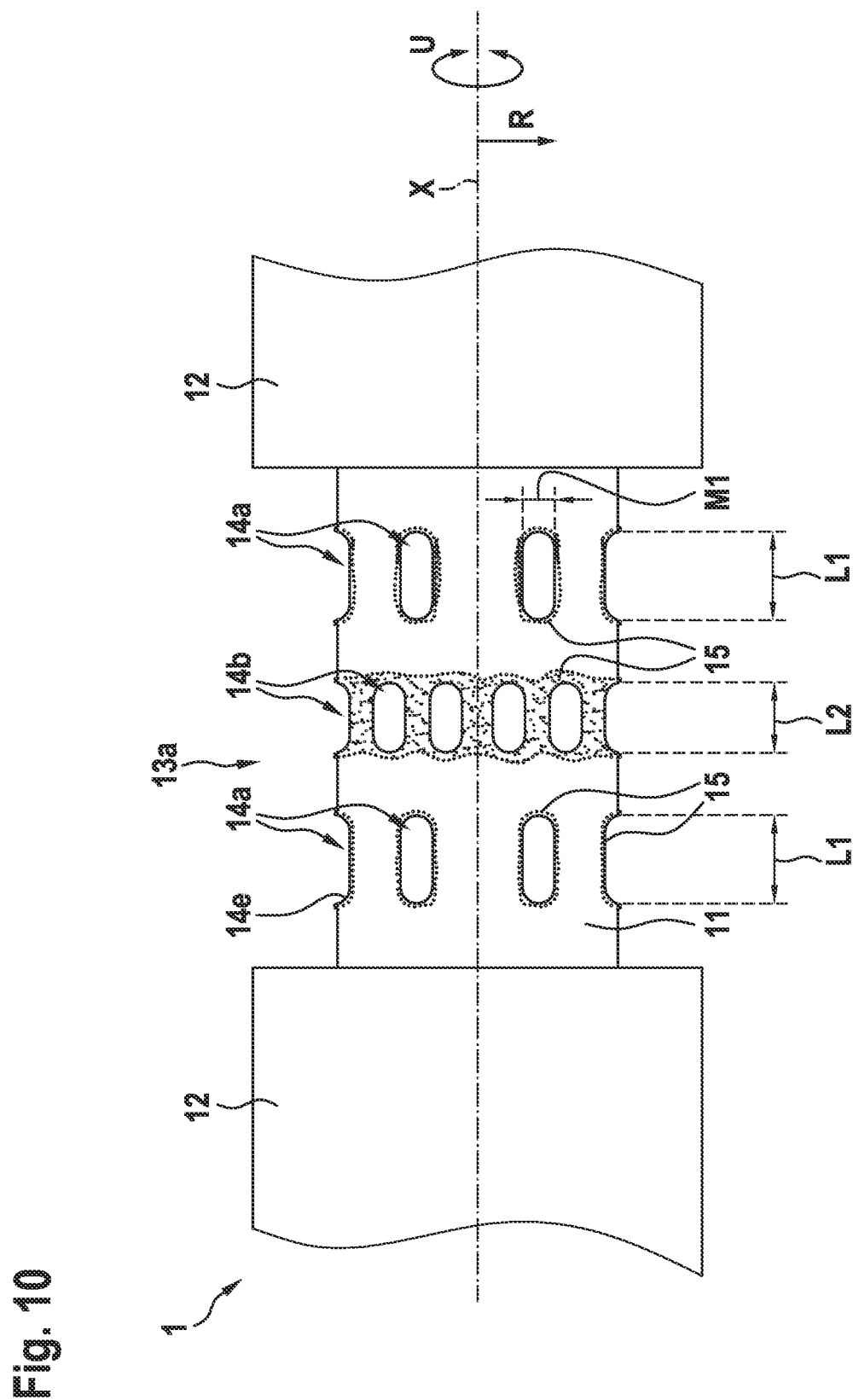
FIG. 10 is a lateral view of the glass fiber from FIG. 9.
Figure 11:
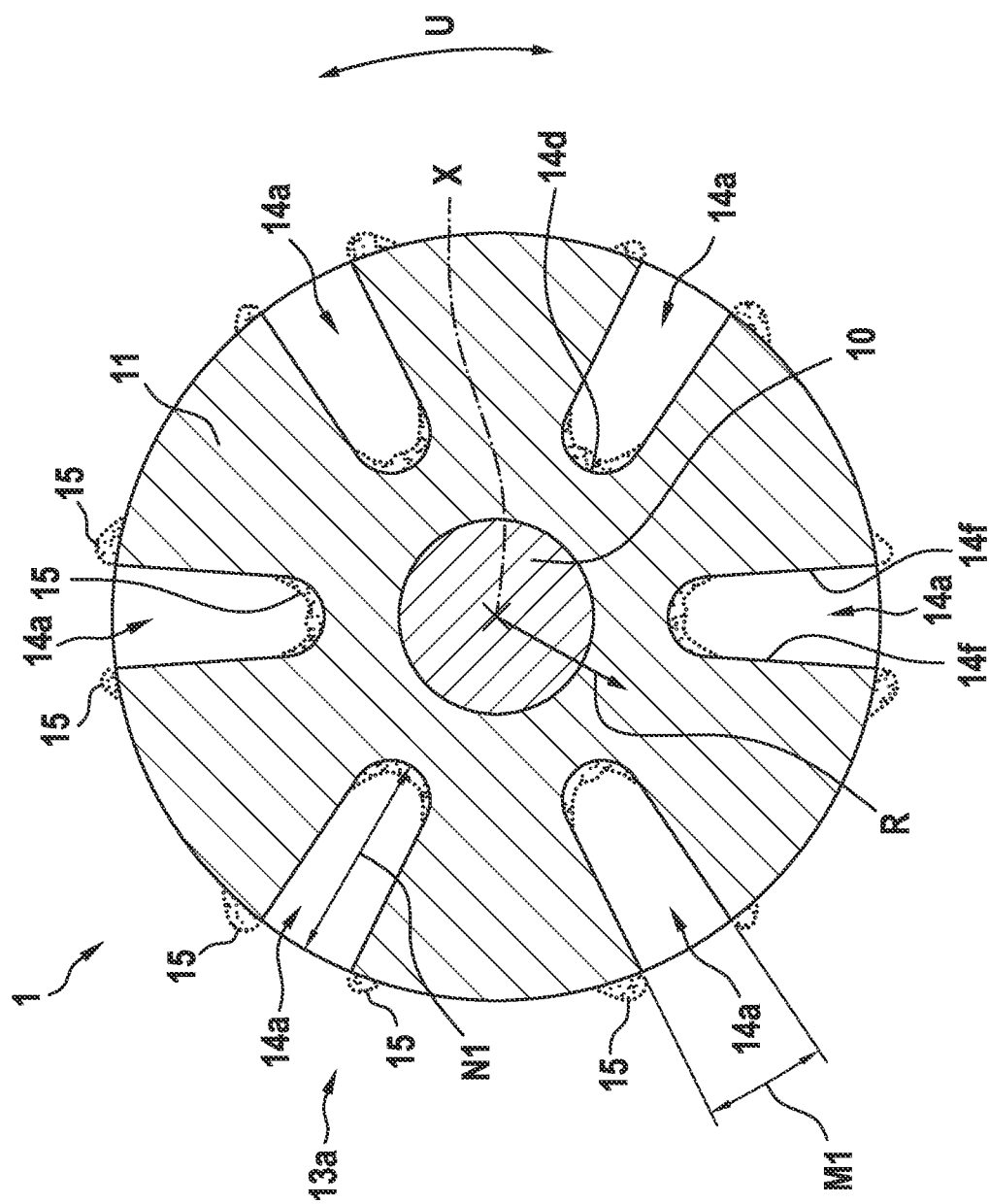
FIG. 11 is a first cross section of the glass fiber from FIG. 9.
Figure 13:
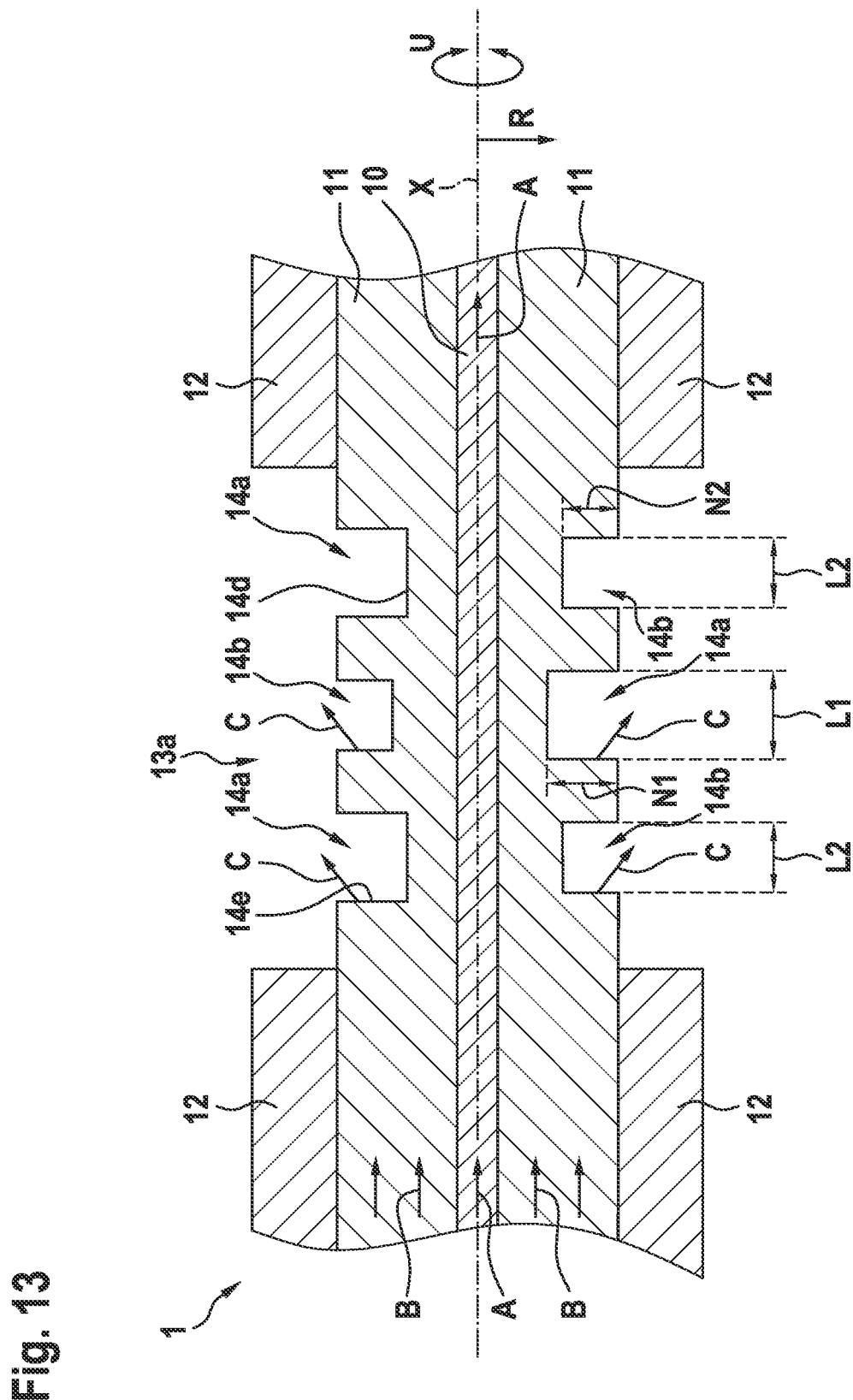
FIG. 13 is a longitudinal section through a glass fiber according to the invention according to a fifth embodiment.

FIG. 9 is a longitudinal section through a glass fiber 1 according to the invention according to a fourth embodiment. FIG. 10 is a lateral view of the glass fiber 1 from FIG. 9. FIG. 11 is a first cross section of the glass fiber 1 from FIG. 9. FIG. 13 is a second cross section of the glass fiber 1 from FIG. 9.

Figure 12:
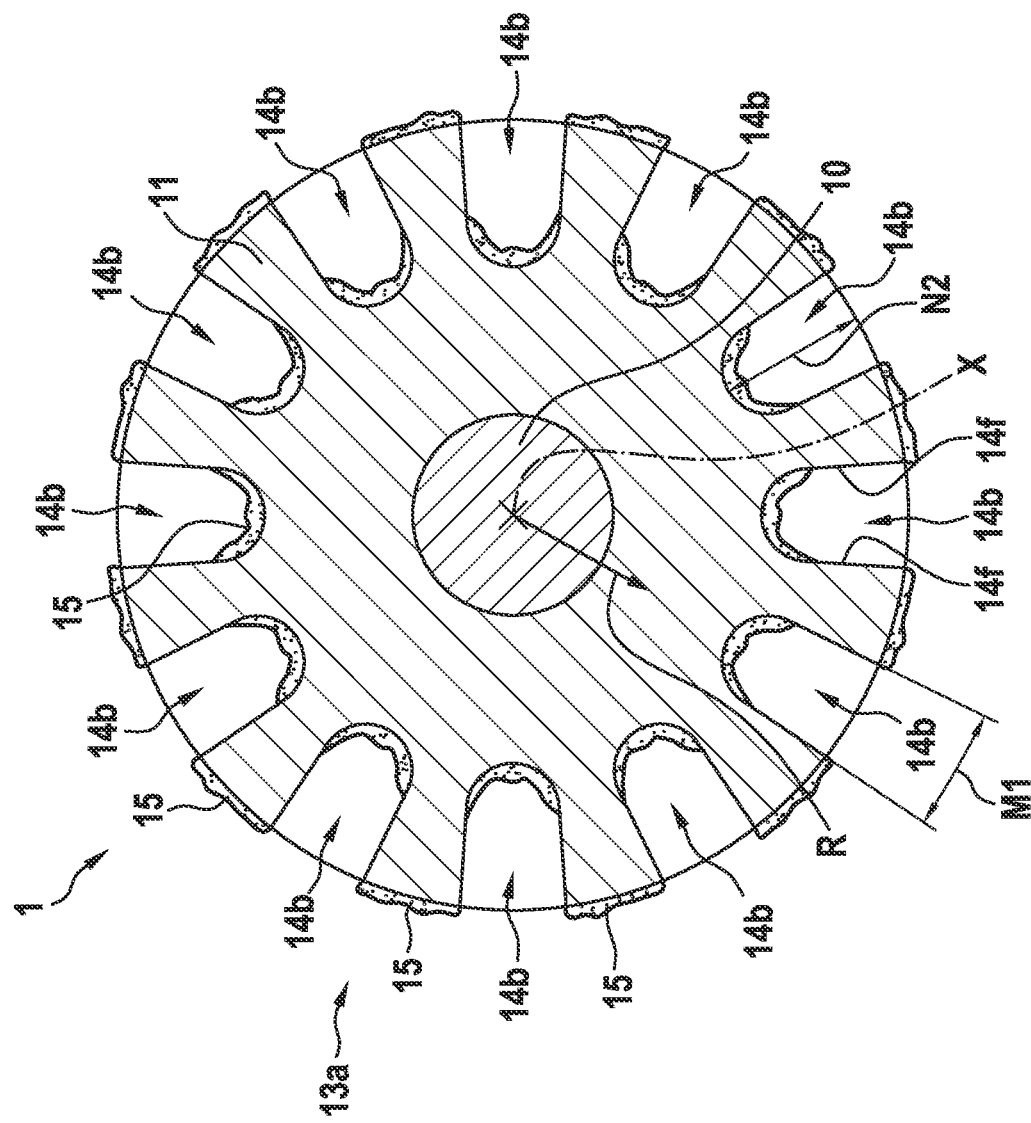
FIG. 12 is a second cross section of the glass fiber from FIG. 9.

According to the fourth embodiment, the longitudinal recesses 14 vary between a first, longer length L1 of the first, longer longitudinal recesses 14a and a second, shorter length L2 of the second, shorter longitudinal recesses 14b. The second, shorter longitudinal recesses 14b are also formed in the radial direction R having a second, smaller depth N2, see FIG. 12, than the first, greater depth N1 of the first, longer longitudinal recesses 14a, see FIG. 11.

As a result, a narrower or more dense arrangement of the second, shorter longitudinal recesses 14b can be achieved in the circumferential direction U, see also FIG. 10, for example. This can lead to the elevations 15 being formed adjacent to one another in the circumferential direction U and, as a result, completely enclosing the radially outer surface of the fiber cladding 11 in the circumferential direction U between the second, shorter longitudinal recesses 14b. This can increase the light-discharging effect of the elevations 15.

Figure 14:
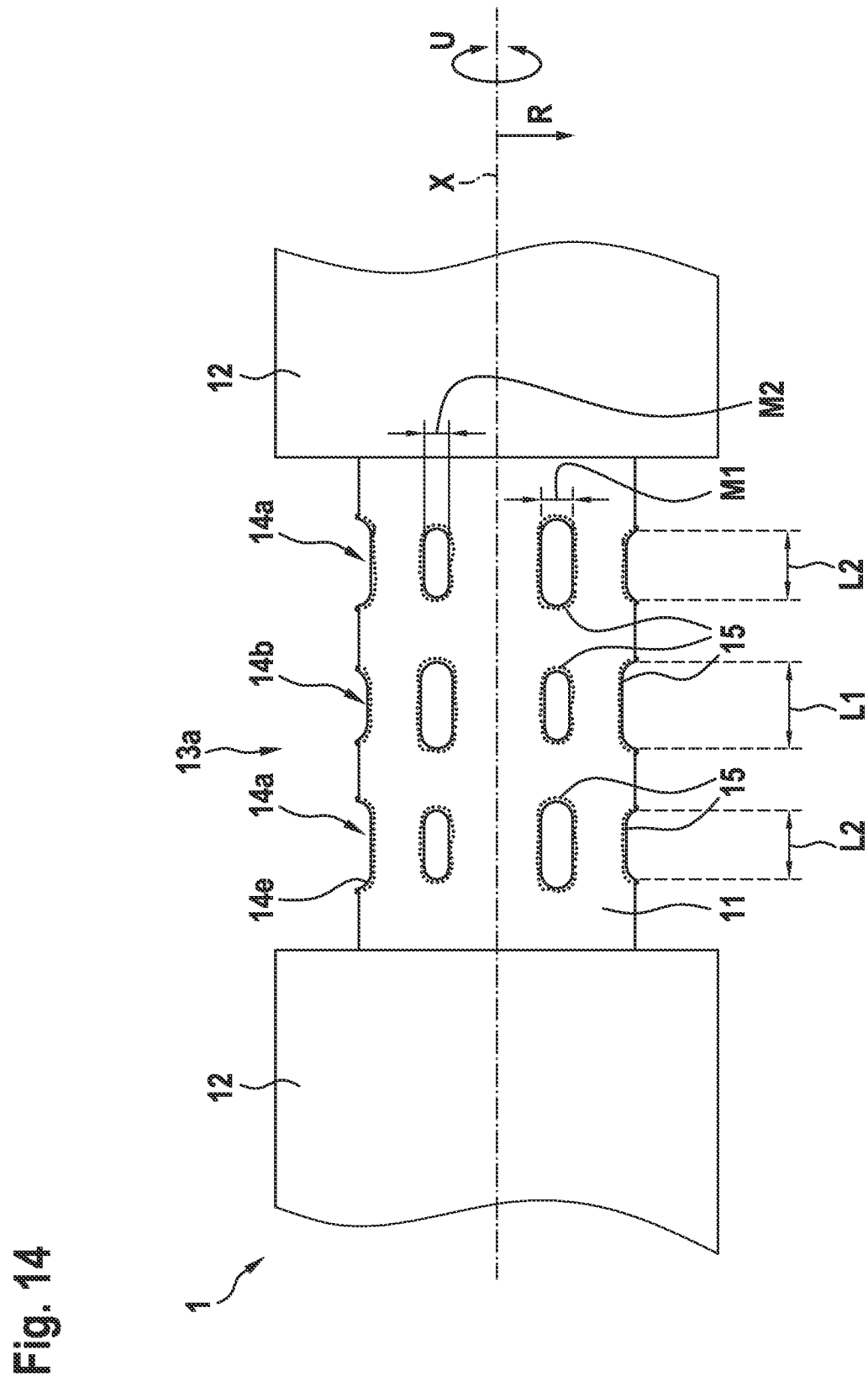
FIG. 14 is a lateral view of the glass fiber from FIG. 13.
Figure 15:
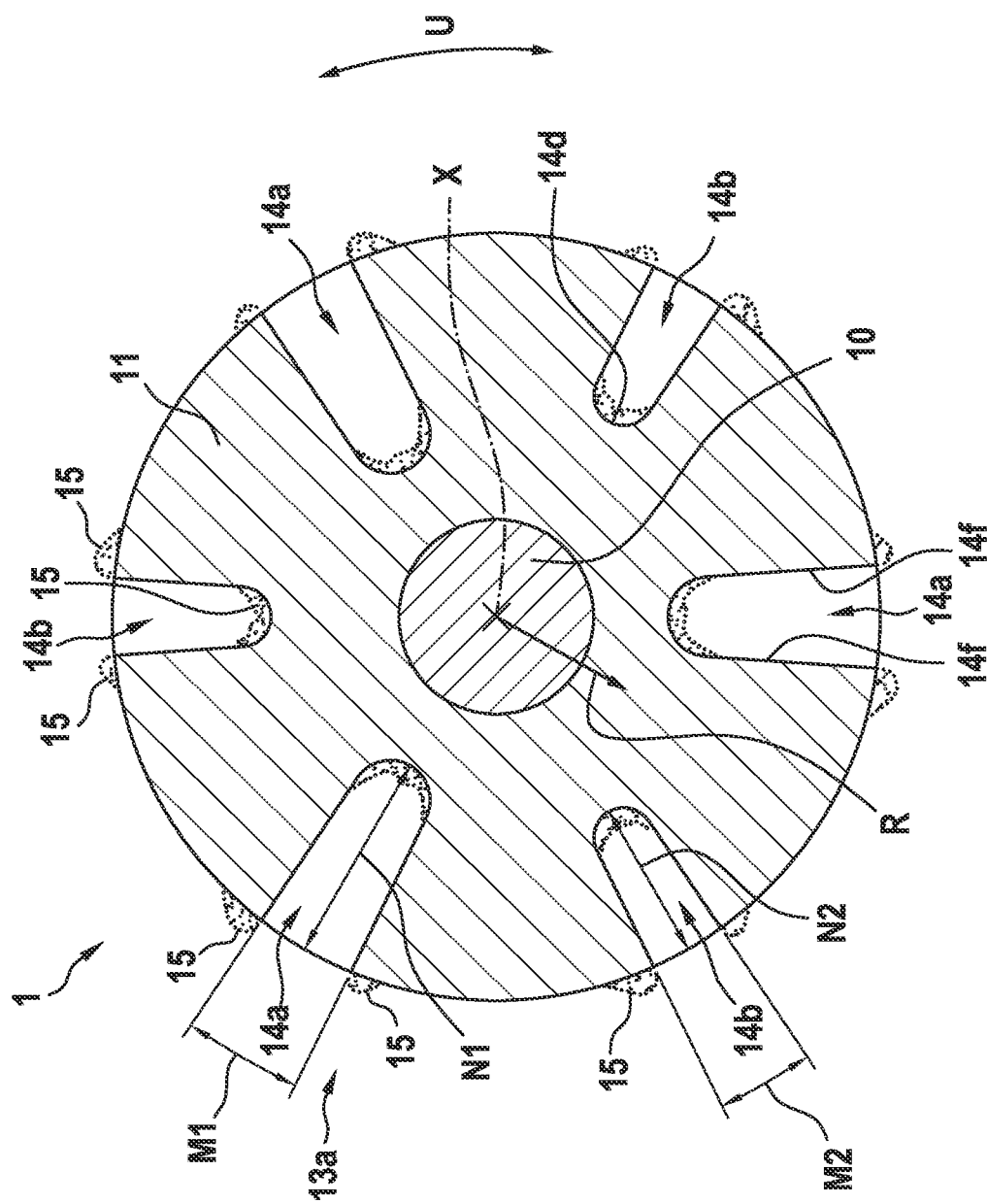
FIG. 15 is a cross section of the glass fiber from FIG. 13.

FIG. 13 is a longitudinal section through a glass fiber 1 according to the invention according to a fifth embodiment. FIG. 14 is a lateral view of the glass fiber 1 from FIG. 13. FIG. 15 is a cross section of the glass fiber 1 from FIG. 13.

According to the fifth embodiment, the first longitudinal recesses 14a and the second longitudinal recesses 14b also differ from the fourth embodiment described above by virtue of a different width M1, M2. This can also further increase the freedom of design in the formation of the longitudinal recesses 14.

Figure 16:
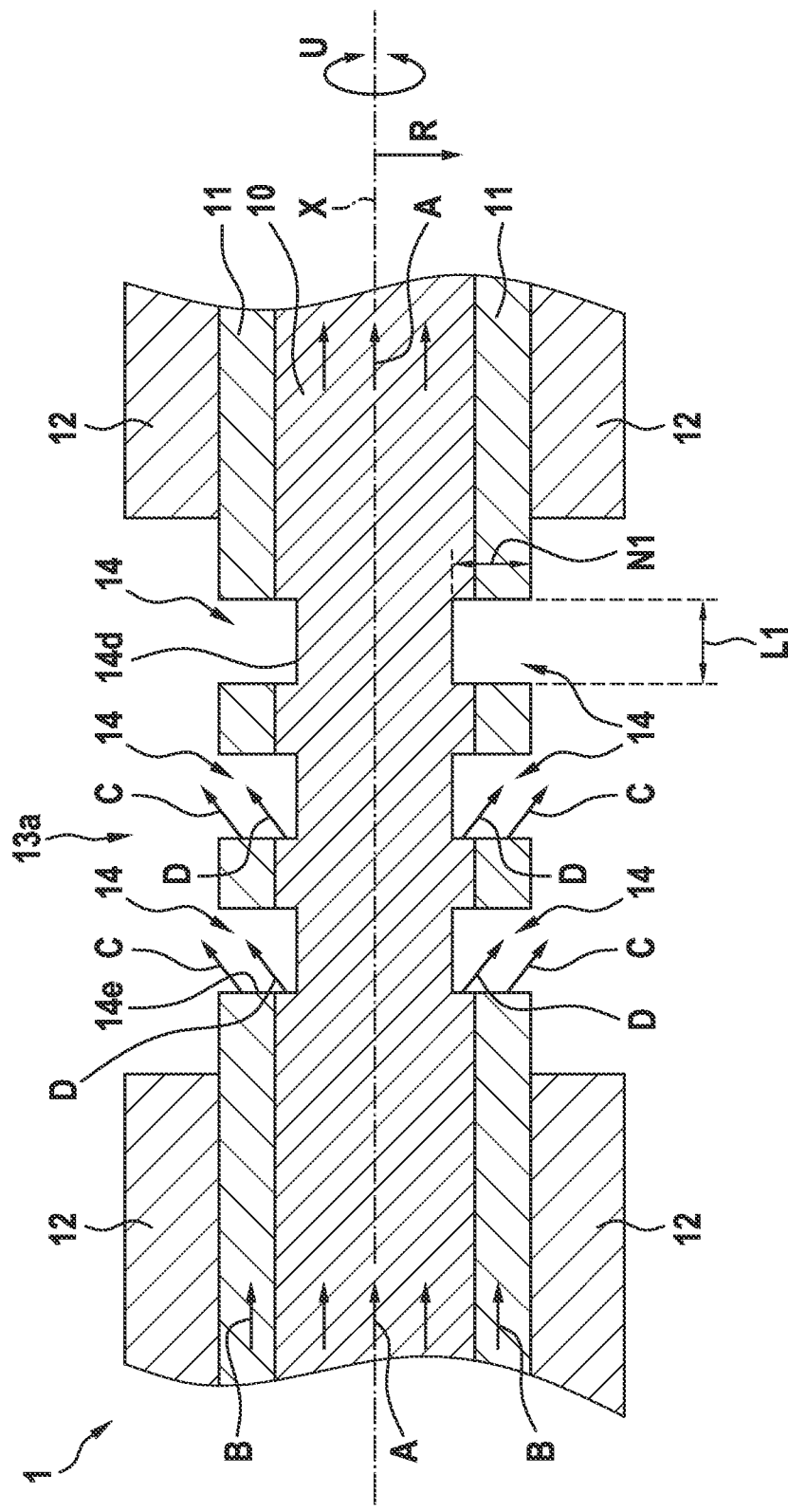
FIG. 16 is a longitudinal section through a glass fiber according to the invention according to a sixth embodiment.
Figure 17:
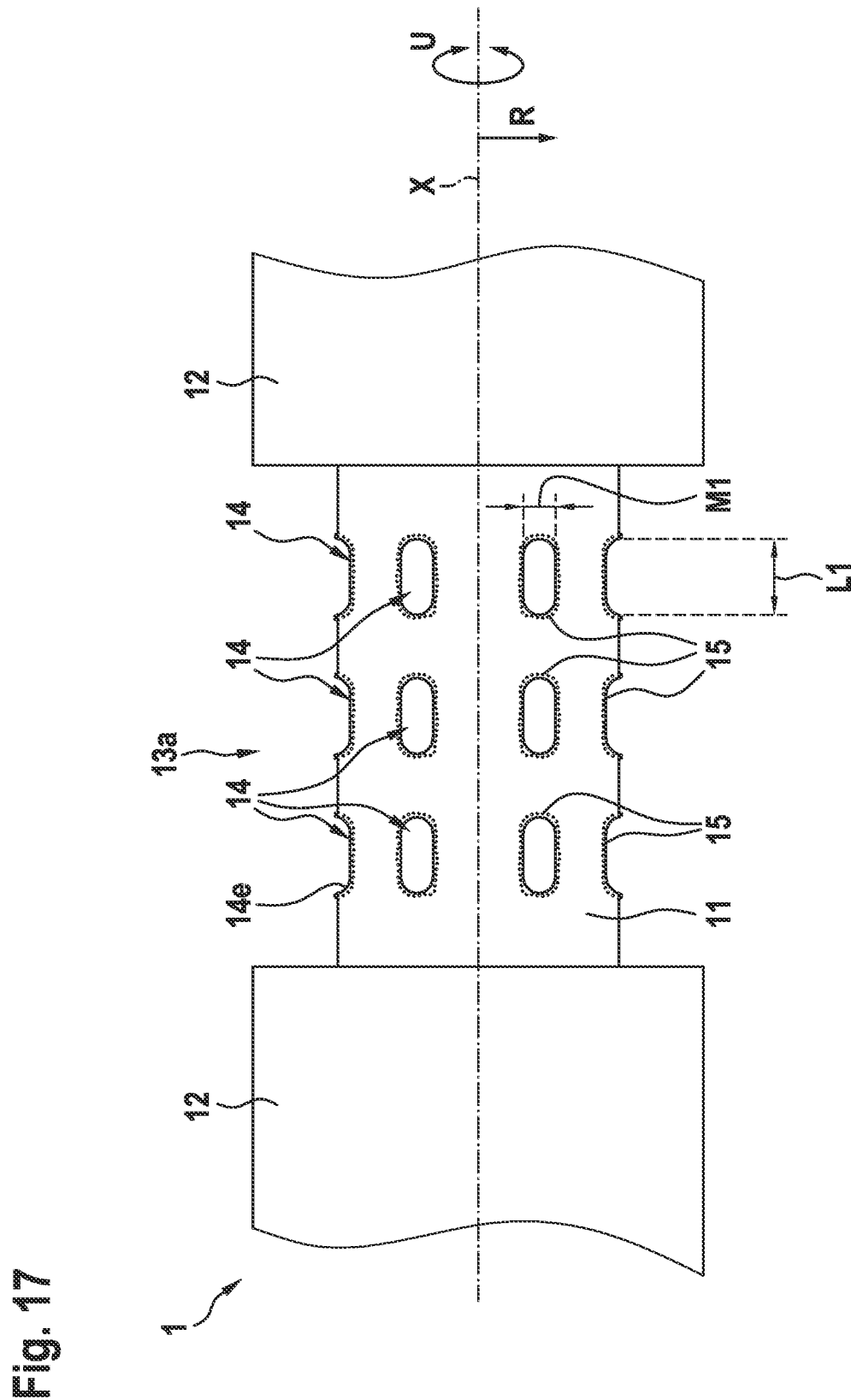
FIG. 17 is a lateral view of the glass fiber from FIG. 16.
Figure 18:
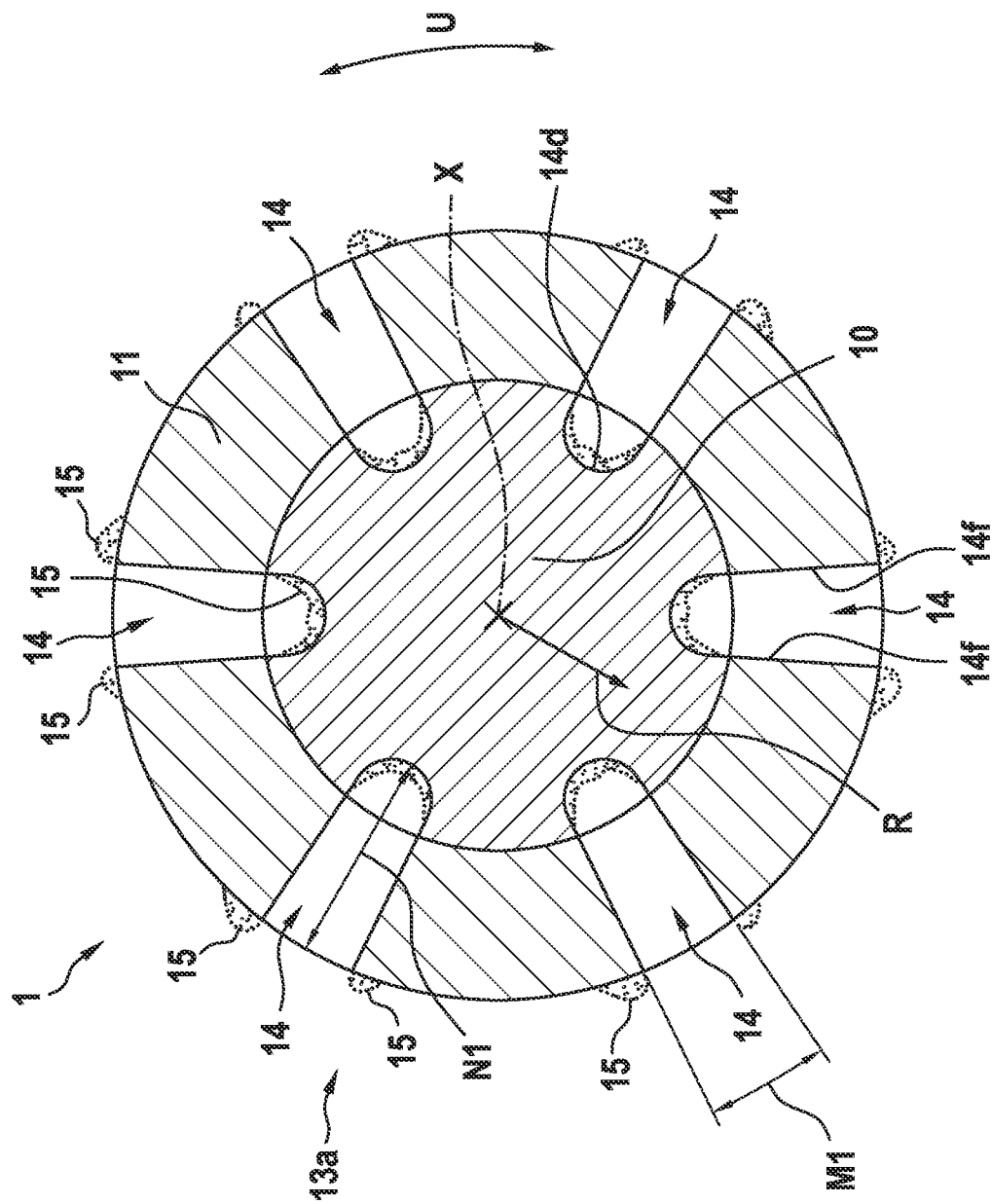
FIG. 18 is a cross section of the glass fiber from FIG. 15.

FIG. 16 is a longitudinal section through a glass fiber 1 according to the invention according to a sixth embodiment. FIG. 17 is a lateral view of the glass fiber 1 from FIG. 16. FIG. 18 is a cross section of the glass fiber 1 from FIG. 16.

According, to the sixth embodiment, the longitudinal recesses 14 extend in the radial direction R into the fiber core 10, which in this case is comparatively thick. In other words, the longitudinal recesses 14 pass through the fiber cladding 11 in the radial direction R and protrude into the fiber core 10. In this way, the fiber cladding 11 can be completely penetrated by the longitudinal recesses 14 in the radial direction R and a correspondingly large amount of cladding light B can be discharged from the fiber cladding 11 as removed cladding light C. In addition, at least some core light A can be discharged from the fiber core 10 to the outside as removed core light D.

Figure 19:
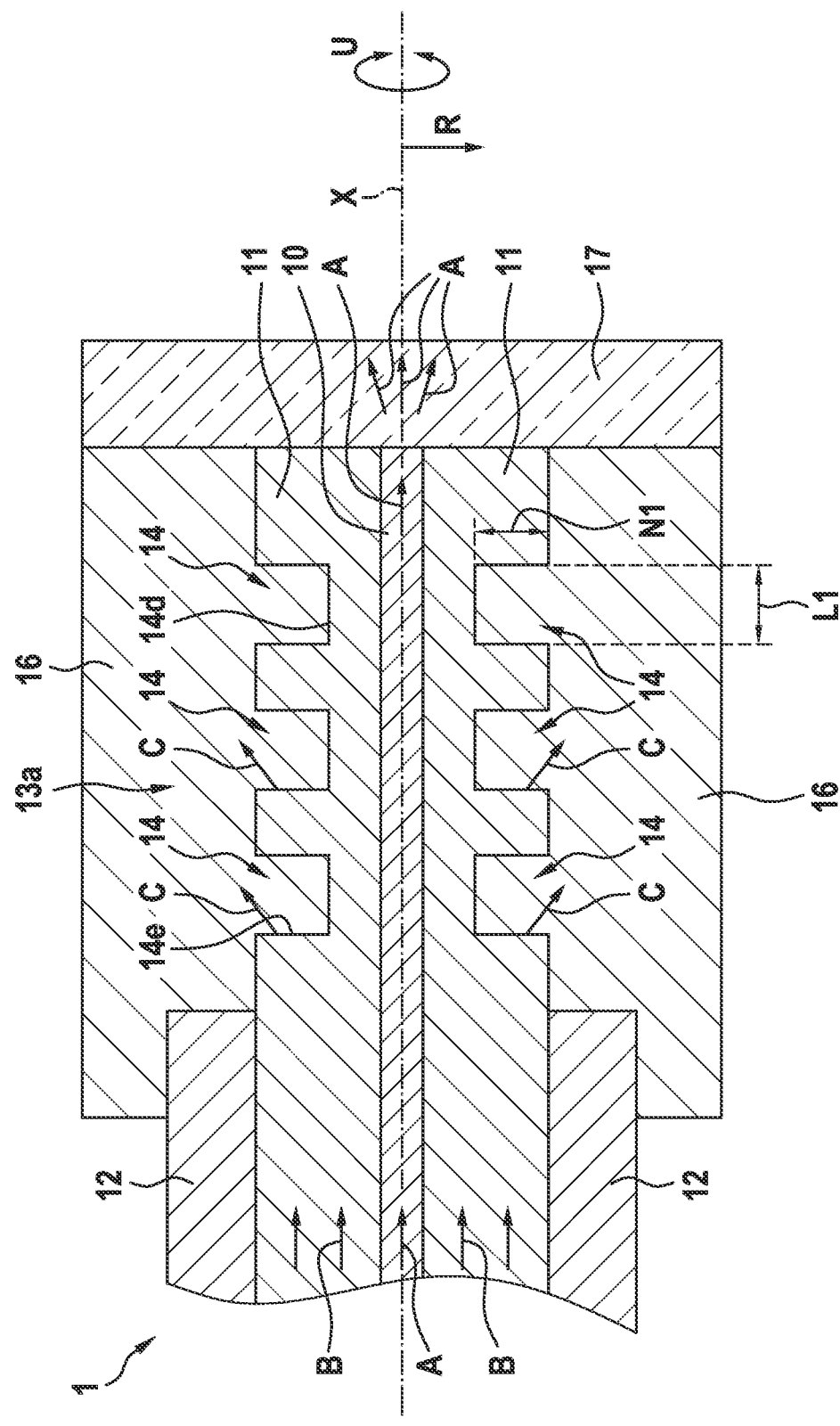
FIG. 19 is a longitudinal section through a glass fiber according to the invention according to a seventh embodiment.

FIG. 19 is a longitudinal section through a glass fiber 1 according to the invention according to a seventh embodiment.

The glass fiber 1 according to the seventh embodiment corresponds to the first embodiment in FIGS. 1 to 4 with respect to its first exposed portion 13a of the longitudinal recesses 14 introduced there. In contrast, however, the fiber core 10 and the fiber cladding 11 end together along the longitudinal axis X on the right-hand side at an open end, at which an optical element 17 is arranged in a bonded manner as an optical window 17 in the form of a glass body. The optical window 17 can also be designed as an optical lens 17. In this way, the core light A can be discharged to the outside at this point in a radially wider distribution.

Figure 20:
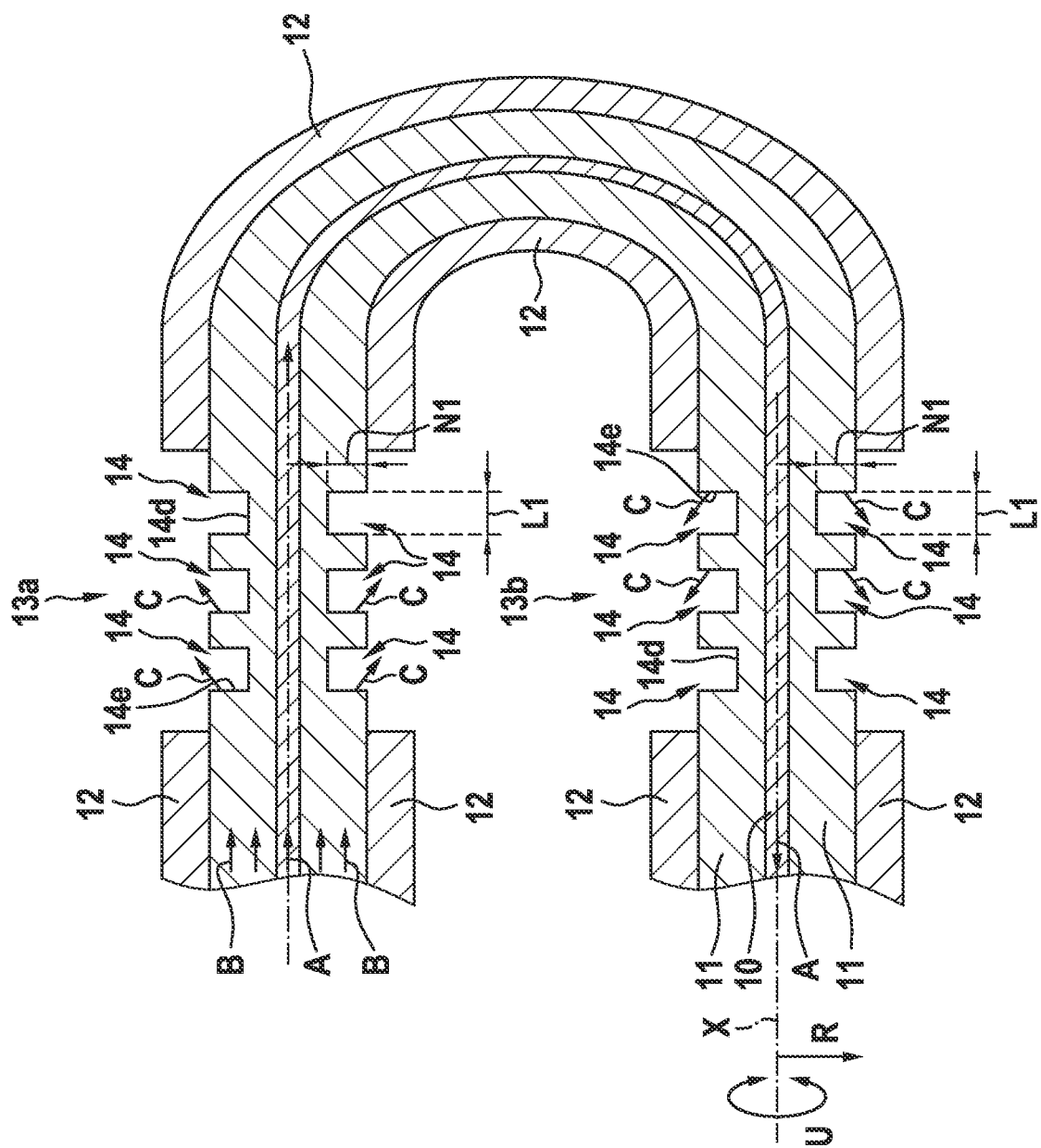
FIG. 20 is a longitudinal section through a glass fiber according to the invention according to an eighth embodiment.

FIG. 20 is a longitudinal section through a glass fiber 1 according to the invention according to an eighth embodiment.

In this case, the glass fiber 1 according to the invention has, in addition to the previously observed first exposed portion 13a, a further second exposed portion 13b. The two exposed portions 13a, 13b have a plurality of the previously described longitudinal recesses 14 according to the invention that can be designed identically or differently and/or identically or differently spaced apart from one another.

The glass fiber 1 is bent in a U-shape between the two exposed portions 13a, 13b, such that the two exposed portions 13a, 13b are arranged and oriented parallel to one another. In this way, the two exposed portions 13a, 13b can be arranged in a space-saving manner, such that a compact arrangement can be provided in this region of the glass fiber 1. As a result of the bend, the diameter or the cross section of the fiber core 10 in the bent region between the two exposed portions 13a, 13b can be somewhat smaller than in the case of the two exposed straight portions 13a, 13b.

FIG. 21 is a longitudinal section through a glass fiber 1 according to the invention according to a ninth embodiment. FIG. 22 is a cross section of the glass fiber 1 from FIG. 21.

The glass fiber 1 according to the ninth embodiment corresponds to the glass fiber 1 according to the first embodiment, with the difference that all longitudinal recesses 14 are completely filled to approximately halfway in height or in the radial direction R with a material filling 18 of the same material. The material of the material filling 18 in this case differs from the material of the fiber cladding 11. The removal of the cladding light B from the fiber cladding 11 can be promoted by the material of the material filling 18 and by its contact with the entire relevant base 14d of the longitudinal recesses 14 and with approximately half of the relevant front face 14e of the longitudinal recesses 14.

LIST OF REFERENCE SIGNS (PART OF THE DESCRIPTION)

A Core light; light in the fiber core 10
B Cladding light; light in the fiber cladding 11
C Removed cladding light
D Removed core light
L1 First length of the longitudinal recesses 14
L2 Second length of the longitudinal recesses 14
L3 Third length of the longitudinal recesses 14
M1 First width of the longitudinal recesses 14
M2 Second width of the longitudinal recesses 14
N1 First depth of the longitudinal recesses 14
N2 Second depth of the longitudinal recesses 14
R Radial direction with respect to the longitudinal axis X
U Circumferential direction with respect to the longitudinal axis X
X Longitudinal axis of the glass fiber 1
1 Glass fiber
10 Fiber core
11 Fiber cladding
12 Fiber coating
13a First exposed portion
13b Second exposed portion
14 Recesses; longitudinal recesses; longitudinal slots
14a First longitudinal recesses
14b Second longitudinal recesses
14c Third longitudinal recesses
14d Base or bottom of the longitudinal recesses 14
14e Front face of the longitudinal recesses 14
14f Lateral walls of the longitudinal recesses 14
15 Elevations; fiber cladding material; glass dust
16 Heat sink; housing
17 Optical element; optical window; optical lens
18 Material filling

The invention claimed is:
1. Glass fiber comprising
at least one fiber core,
at least one fiber cladding which at least substantially encloses the fiber core in the circumferential direction and along the longitudinal axis, and
at least one fiber coating which substantially encloses the fiber cladding in the circumferential direction and along the longitudinal axis,
the glass fiber having at least one first exposed portion where the fiber cladding is exposed by the fiber coating for removing light at least from the fiber cladding,
the fiber cladding, at least, having a plurality of recesses at least substantially in the radial direction, which recesses are designed to at least partially remove the light at least from the fiber cladding,
characterized in that the recesses extend in a substantially longitudinal direction parallel to the longitudinal axis and the recesses are each formed at least in portions precisely along the longitudinal axis; and
the outer surface of the fiber cladding at least in portions has a plurality of elevations at least directly next to at least some of the recesses.

2. Glass fiber according to claim 1, characterized in that the longitudinal recesses are each formed completely precisely along the longitudinal axis, completely precisely in the radial direction, or completely precisely along the longitudinal axis and in the radial direction.

3. Glass fiber according to claim 1, characterized in that the longitudinal recesses each have a width in the circumferential direction that corresponds to the width of a tool by means of which the longitudinal recesses were introduced at least into the fiber cladding.

4. Glass fiber according to claim 1, characterized in that at least some of the longitudinal recesses are differently spaced apart from one another in the circumferential direction, along the longitudinal axis, or in the circumferential direction and along the longitudinal axis.

5. Glass fiber according to claim 1, characterized in that the longitudinal recesses are increasingly spaced apart from one another along the longitudinal axis in the propagation direction of the light.

6. Glass fiber according to claim 1, characterized in that at least some of the longitudinal recesses are uniformly spaced apart from one another in the circumferential direction and/or along the longitudinal axis.

7. Glass fiber according to claim 1, characterized in that at least one first longitudinal recess has a first length along the longitudinal axis and at least one second longitudinal recess has a second length along the longitudinal axis, the first length and the second length being different.

8. Glass fiber according to claim 1, characterized in that at least one first longitudinal recess has a first width in the circumferential direction and at least one second longitudinal recess has a second width in the circumferential direction, the first width and the second width being different.

9. Glass fiber according to claim 1, characterized in that at least one first longitudinal recess has a first depth in the radial direction and at least one second longitudinal recess has a second depth in the radial direction, the first depth and the second depth being different.

10. Glass fiber according to claim 1, characterized in that the first exposed portion is surrounded by a heat sink at least in portions, preferably completely, so as to be in contact or spaced apart, the heat sink, facing the exposed portion, being designed at least in portions to absorb, reflect, or absorb and reflect the light at least from the fiber cladding.

11. Glass fiber according to claim 1, characterized by at least one second exposed portion where the fiber cladding is exposed by the fiber coating for removing light at least from the fiber cladding, the first exposed portion and the second exposed portion being arranged at least in portions at an angle to one another.

12. Glass fiber according to claim 1, characterized by an optical element which is arranged at an open end of the fiber core and forms an open end of the glass fiber along the longitudinal axis.

13. Glass fiber according to claim 1, characterized in that at least some of the longitudinal recesses extend in the radial direction into the fiber core.

14. Glass fiber according to claim 1, characterized in that the outer surface of the fiber cladding at least in portions has a plurality of elevations next to all of the longitudinal recesses.

15. Glass fiber according to claim 1, characterized in that the elevations of the same longitudinal recess and/or of a plurality of longitudinal recesses are at least partially identical or different with respect to material, thickness, refractive index, shape, distribution and/or density.

16. Glass fiber according to claim 1, characterized in that at least some of the elevations are formed by fiber cladding material which is generated by at least one tool when the longitudinal recesses are introduced at least into the fiber cladding.

17. Glass fiber according to claim 1, characterized in that at least one longitudinal recess particularly preferably all of the longitudinal recesses, at least in portions, preferably completely, has at least one material filling the material of the at least one material filling differing from the material of the fiber core and/or from the material of the fiber cladding.

18. Glass fiber according to claim 17, characterized in that the material of the at least one material filling has a refractive index which promotes the removal of light at least from the fiber cladding.

19. Glass fiber according to claim 17, characterized in that at least two longitudinal recesses are filled with the at least one material filling to different lengths, widths and/or heights.

20. Glass fiber according to claim 17, characterized in that at least two longitudinal recesses have different materials of the at least one material filling.

21. Glass fiber product comprising at least one glass fiber according to claim 1.

* * * * *